(12) United States Patent
Noguchi et al.

(10) Patent No.: US 10,324,579 B2
(45) Date of Patent: *Jun. 18, 2019

(54) DISPLAY APPARATUS WITH TOUCH DETECTION FUNCTIONS AND WITH DRIVING ELECTRODES SHARED BY TWO MORE PIXELS IN THE SAME COLUMN, DRIVING METHOD FOR SAME, AND MOBILE DEVICE WITH SAME

(71) Applicant: Japan Display Inc., Tokyo (JP)

(72) Inventors: Koji Noguchi, Kanagawa (JP); Yoshitoshi Kida, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,343

(22) Filed: Oct. 16, 2018

(65) Prior Publication Data

US 2019/0050084 A1  Feb. 14, 2019

Related U.S. Application Data

(63) Continuation of application No. 15/884,509, filed on Jan. 31, 2018, now Pat. No. 10,133,437, which is a
(Continued)

(30) Foreign Application Priority Data

Apr. 28, 2010 (JP) ................ 2010-104050

(51) Int. Cl.
*G06F 3/044* (2006.01)
*G06F 3/041* (2006.01)
*G02F 1/1333* (2006.01)

(52) U.S. Cl.
CPC ............ *G06F 3/044* (2013.01); *G06F 3/0416* (2013.01); *G02F 1/13338* (2013.01)

(58) Field of Classification Search
CPC ........ G06F 3/041; G06F 3/0412; G06F 3/044; G06F 3/0416; G06F 3/0488
See application file for complete search history.

(56) References Cited

U.S. PATENT DOCUMENTS

2002/0033925 A1  3/2002  Ito
2007/0285389 A1  12/2007  Ito
(Continued)

FOREIGN PATENT DOCUMENTS

JP  2007-257164  4/2007
JP  2009-244958  10/2009

OTHER PUBLICATIONS

Taiwan Examination Report issued in connection with counterpart Taiwan patent application No. 100113933 dated Mar. 28, 2014.
(Continued)

*Primary Examiner* — Lisa S Landis
(74) *Attorney, Agent, or Firm* — Dentons US LLP

(57) ABSTRACT

A display apparatus with a substrate having a long side and a short side, a plurality of driving electrodes arranged on the substrate parallel to the long side of the substrate, a plurality of touch detection electrodes arranged on the substrate parallel to the short side of the substrate, a control unit electrically coupled to each of the plurality of driving electrodes and which sequentially drives the plurality of driving electrodes, and a detection unit electrically coupled to each of the touch detection electrodes.

7 Claims, 20 Drawing Sheets

Related U.S. Application Data continuation of application No. 15/713,811, filed on Sep. 25, 2017, now Pat. No. 9,927,937, which is a continuation of application No. 13/087,439, filed on Apr. 15, 2011, now Pat. No. 9,804,711.

(56) References Cited

U.S. PATENT DOCUMENTS

| | | | |
|---|---|---|---|
| 2008/0062140 A1* | 3/2008 | Hotelling | G09G 3/3648 345/173 |
| 2008/0180421 A1 | 7/2008 | Yudasaka | |
| 2008/0198152 A1 | 8/2008 | Ozawa | |
| 2008/0309627 A1* | 12/2008 | Hotelling | G02F 1/134363 345/173 |
| 2008/0309633 A1 | 12/2008 | Hotelling et al. | |
| 2010/0110040 A1* | 5/2010 | Kim | G06F 3/0412 345/174 |
| 2010/0182273 A1 | 7/2010 | Noguchi et al. | |

OTHER PUBLICATIONS

Korean Office Action issued in connection with related Korean Application No. KR 10-2011-0036629 dated Nov. 21, 2016.

* cited by examiner

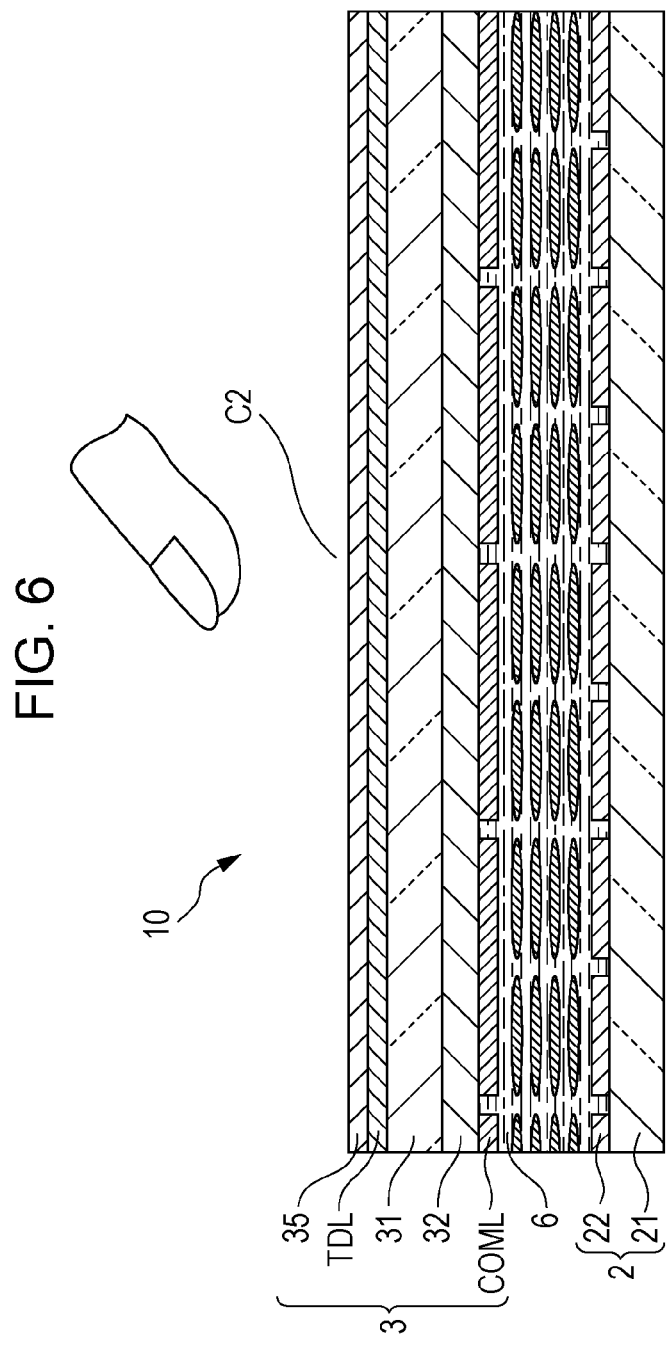

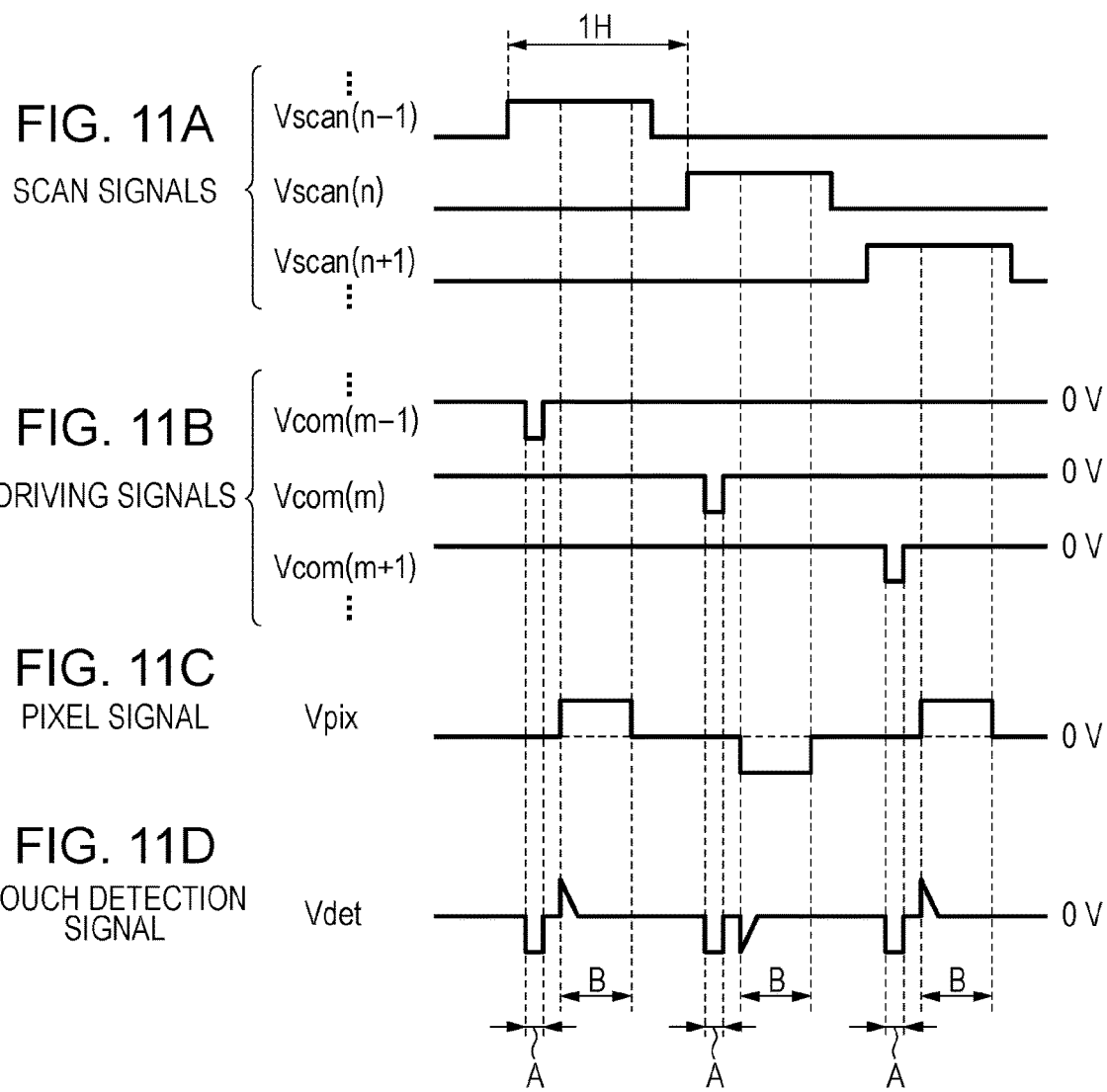

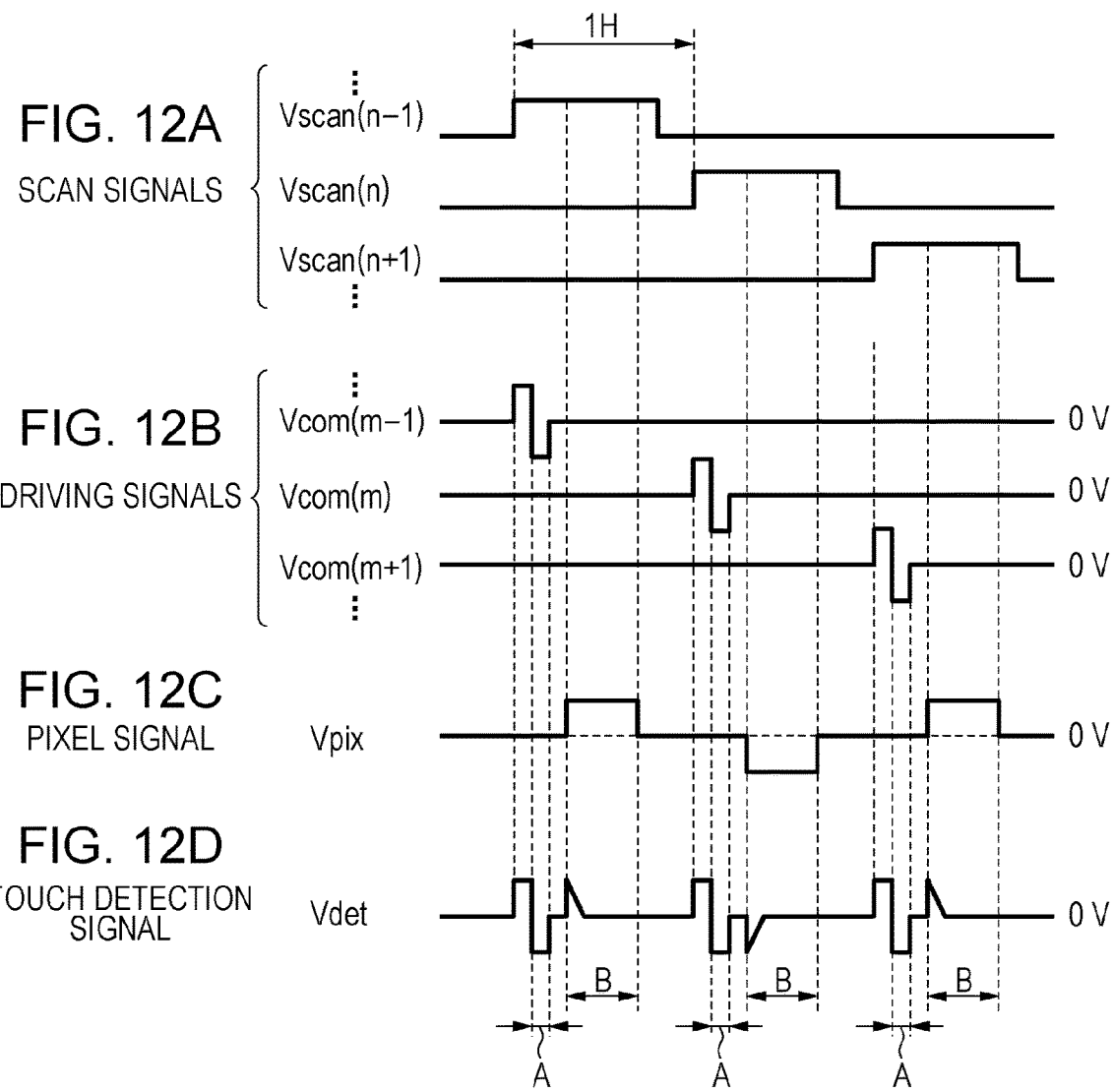

SCAN SIGNALS

DRIVING SIGNALS

PIXEL SIGNAL

TOUCH DETECTION SIGNAL

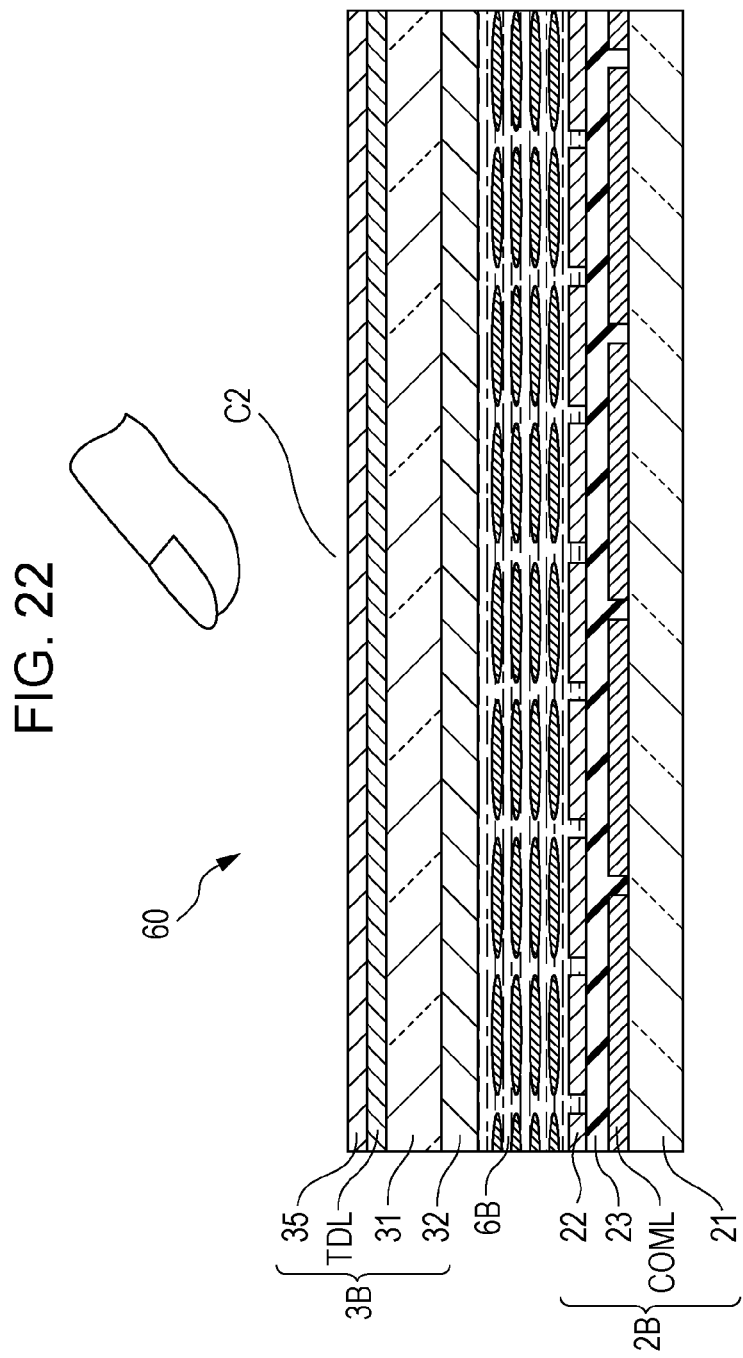

DISPLAY APPARATUS WITH TOUCH DETECTION FUNCTIONS AND WITH DRIVING ELECTRODES SHARED BY TWO MORE PIXELS IN THE SAME COLUMN, DRIVING METHOD FOR SAME, AND MOBILE DEVICE WITH SAME

CROSS-REFERENCE TO RELATED APPLICATIONS

This application is a continuation of U.S. patent application Ser. No. 15/884,509 filed Jan. 31, 2018, which is a continuation of U.S. patent application Ser. No. 15/713,811, filed Sep. 25, 2017, now U.S. Pat. No. 9,927,937 issued Mar. 27, 2018, which is a continuation of U.S. patent application Ser. No. 13/087,439, filed Apr. 15, 2011, now U.S. Pat. No. 9,804,711 issued Oct. 31, 2017, the entireties of which are incorporated herein by reference to the extent permitted by law. This application claims the benefit of the filing date of Japanese Priority Patent Application JP 2010-104050 filed in the Japan Patent Office on Apr. 28, 2010, the entire contents of which are hereby incorporated by reference.

BACKGROUND OF THE INVENTION

The present invention relates to a display apparatus able to detect external proximate objects. More particularly, the present invention relates to a display apparatus with touch detection functions that detect touch on the basis of changes in capacitance, as well as to a driving method for such an apparatus, and to an electronic device provided with such an apparatus.

In recent years, display apparatus such as liquid crystal display (LCD) apparatus have become equipped with touch detection functions that detect external proximate objects, such as fingers. Attention is being focused on display apparatus that enable information input by causing various button images or other elements to be displayed on such display apparatus, which works as a substitute for ordinary mechanical buttons. Since display apparatus that include such touch detection functions can be operated without input apparatus such as a keyboard, mouse, or keypad, their usage is being expanded to computers and even to devices such as mobile phones and similar mobile information terminals.

Several touch detection techniques exist. One such technique is the capacitive technique. For example, Japanese Unexamined Patent Application Publication No. 2009-244958 discloses a display apparatus wherein a common electrode already provided in the display apparatus for display purposes is also used as one half of a pair of touch sensor electrodes. The other electrode (i.e., the touch detection electrode) is disposed intersecting the common electrode. A capacitance is formed between the common electrode and the touch detection electrode, and this capacitance will change in response to an external proximate object. Consequently, the display apparatus is configured to detect external proximate objects by analyzing a touch detection signal appearing at the touch detection electrode when a driving signal for touch detection is applied to the common electrode. In this display apparatus, display operation is carried out by conducting a line-sequential scan (i.e., a display scan), similarly to a typical LCD apparatus. Additionally, touch detection operation is carried out by successively applying the above driving signal for touch detection to the common electrode and conducting a line-sequential scan (i.e., a touch detection operation).

Meanwhile, in recent years, design and other factors have led to a desire to decrease the width of the area running along the outer edge of the active display area (i.e., the bezel or frame area). This demand is particularly strong with respect to mobile information terminals, where the factors of portability and ease of use have led to demand for more compact devices. As a result, it has become important to decrease the bezel width of the display apparatus provided in such mobile information terminals.

In the display apparatus disclosed in JP-A-2009-244958 cited above, the display scan and the touch detection operation run in the same direction, and there are provided a plurality of touch detection electrodes that extend in the direction of these scans. In order for the touch detection signals output from these touch detection electrodes to be transmitted to a touch detection circuit, space is provided for signal retrieval and circuit pattern routing. Consequently, the bezel width might increase in those areas. In other words, the bezel width increases along the edge that intersects the display scan direction.

More specifically, in a landscape display apparatus, for example, the display scan is conducted while moving down along the short edge direction. For this reason, the touch detection electrodes are provided extending in the short-edge direction, and a plurality of touch detection signals are output from the long edge on one side. When mounting such a display apparatus into a module, a flexible substrate or similar technology is used for the signal retrieval and circuit pattern routing disposed in order to transmit this plurality of touch detection signals to the touch detection circuit. As a result, the bezel width is increased along the long edge.

Being devised in light of such problems, embodiments of the present invention provide a display apparatus with touch detection functions, a driving method, and an electronic device that enable the bezel width to be decreased along the edge that intersects the display scan direction.

SUMMARY

One embodiment that is consistent with the present invention includes display apparatus comprising a substrate having a long side and a short side, a plurality of driving electrodes arranged on the substrate parallel to the long side of the substrate, a plurality of touch detection electrodes arranged on the substrate parallel to the short side of the substrate, a control unit electrically coupled to each of the plurality of driving electrodes and which sequentially drives the plurality of driving electrodes, and a detection unit electrically coupled to each of the touch detection electrodes.

In another embodiment that is consistent with the present invention, the control unit sequentially drives each of the plurality of driving electrodes in a display mode. In another embodiment that is consistent with the present invention each touch detection electrode has a corresponding driving electrode, and each of the touch detection electrodes transmits a touch detection signal to the touch detection unit when the control unit drives the corresponding driving electrode.

In another embodiment that is consistent with the present invention, the control unit sequentially drives the plurality of driving electrodes with pulsed touch driving signals during the touch detection period.

In another embodiment that is consistent with the present invention, the display apparatus of includes a plurality of pixels, a plurality of signal electrodes, each signal electrode coupled to at least one pixel and disposed in parallel to a corresponding driving electrode.

In another embodiment that is consistent with the present invention, the control unit transmits a pixel signal to each of the plurality of signal electrodes in a display mode, and the plurality of pixels display an image during the display mode.

In another embodiment that is consistent with the present invention, each driving electrode has a corresponding touch detection electrode, during a touch detection period, the control unit transmits a touch driving signal to one of the signal electrodes after putting the corresponding driving electrode into a floating state, thereby propagating the touch driving signal to the driving electrode via capacitive coupling between the signal electrode and the driving electrode, and the touch detection electrode receives the touch driving signal from the corresponding driving electrode and outputs a touch detection signal in response to the touch driving signal.

In another embodiment that is consistent with the present invention, the detection unit includes an analog low pass filter, an analog to digital converter, a signal processor, a coordinate extractor, and a detection timing controller.

In another embodiment that is consistent with the present invention, the direction in which the driving electrodes are sequentially scanned during a display mode differs from the direction in which the driving electrodes are sequentially scanned in a touch detection mode.

In another embodiment that is consistent with the present invention, intersecting electrode patterns between the driving electrodes and the touch detection electrodes form a capacitor at each intersection site.

In another embodiment that is consistent with the present invention the control unit sequentially scans each of the plurality of driving units along the long side of the display device during a display mode and the control unit sequentially scans each of the plurality of driving units along the short side of the display device during a touch detection mode.

In another embodiment that is consistent with the present invention, each of the pixels includes a display element between a signal line and one of the driving electrodes, In another embodiment that is consistent with the present invention, the display elements are liquid crystal display elements having a liquid crystal layer.

Another embodiment that is consistent with the present invention includes a method of detecting an object in contact with a display apparatus comprising the steps of providing a display apparatus with a substrate having a long side and a short side, the substrate having a plurality of driving electrodes arranged on the substrate parallel to the long side of the substrate, the substrate also having a plurality of touch detection electrodes arranged on the substrate parallel to the short side of the substrate.

In another embodiment that is consistent with the present invention, the control unit sequentially drives each of the plurality of driving electrodes in a display mode.

In another embodiment that is consistent with the present invention, each touch detection electrode has a corresponding driving electrode, and each of the touch detection electrodes transmits a touch detection signal to the touch detection unit when the control unit drives the corresponding driving electrode.

In another embodiment that is consistent with the present invention, the control unit sequentially drives the plurality of driving electrodes with pulsed touch driving signals during the touch detection period.

In another embodiment that is consistent with the present invention, the method includes the steps of electrically coupling each of a plurality of signal electrodes to at least one of a plurality of pixels, where the signal electrodes are disposed in parallel to a corresponding driving electrode.

In another embodiment that is consistent with the present invention, the control unit transmits a pixel signal to each of the plurality of signal electrodes in a display mode and the plurality of pixels display an image during the display mode.

In another embodiment that is consistent with the present invention the method includes the steps of transmitting a touch driving signal to one of the signal electrodes after putting a driving electrode that corresponds to a touch detection electrode into a floating state, thereby propagating the touch driving signal to the driving electrode via capacitive coupling between the signal electrode and the driving electrode, and receiving the touch driving signal from the corresponding driving electrode and outputting a touch detection signal in response to the touch driving signal.

In another embodiment that is consistent with the present invention, the detection unit includes an analog low pass filter, an analog to digital converter, a signal processor, a coordinate extractor, and a detection timing controller.

In another embodiment that is consistent with the present invention the direction in which the driving electrodes are sequentially scanned during a display mode differs from the direction in which the driving electrodes are sequentially scanned in a touch detection mode.

In another embodiment that is consistent with the present invention, intersecting electrode patterns between the driving electrodes and the touch detection electrodes form a capacitor at each intersection site.

In another embodiment that is consistent with the present invention, the control unit sequentially scans each of the plurality of driving units along the long side of the display device during a display mode and the control unit sequentially scans each of the plurality of driving units along the short side of the display device during a touch detection mode.

In another embodiment that is consistent with the present invention, each of the pixels includes a display element between a signal line and one of the driving electrodes.

In another embodiment that is consistent with the present invention, the display elements are liquid crystal display elements having a liquid crystal layer.

Another embodiment that is consistent with the present invention includes, a mobile device comprising a display apparatus including a substrate having a short side and a long side, a plurality of driving electrodes arranged parallel to the long side of the substrate, a plurality of touch detection electrodes arranged parallel to the short side of the substrate, a control unit electrically coupled to each of the plurality of driving electrodes and which sequentially drives the plurality of driving electrodes, and a detection unit electrically coupled to each of the plurality of touch detection electrodes.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 6 is a cross section illustrating a schematic cross-sectional structure of the display device with touch detection functions that is consistent with the present invention;

FIGS. 11A to 11D depict timing waveform diagrams illustrating a display apparatus with touch detection functions that is consistent with the present invention;

FIGS. 12A to 12D depict timing waveform diagrams of a display apparatus with touch detection functions that is consistent with the present invention;

FIG. 22 depicts a schematic cross-sectional structure of a display device with touch detection functions a display apparatus with touch detection functions that is consistent with the present invention.

DESCRIPTION OF THE PREFERRED EMBODIMENTS

Figure 1A:
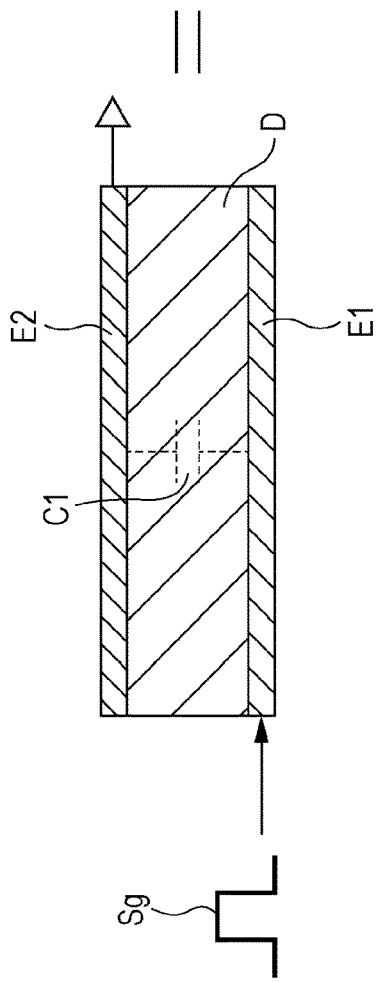
FIGS. 1A and 1B illustrate a state when a finger is not in contact or near-contact with a display apparatus with touch detection functions that is consistent with the present invention.
Figure 3A:
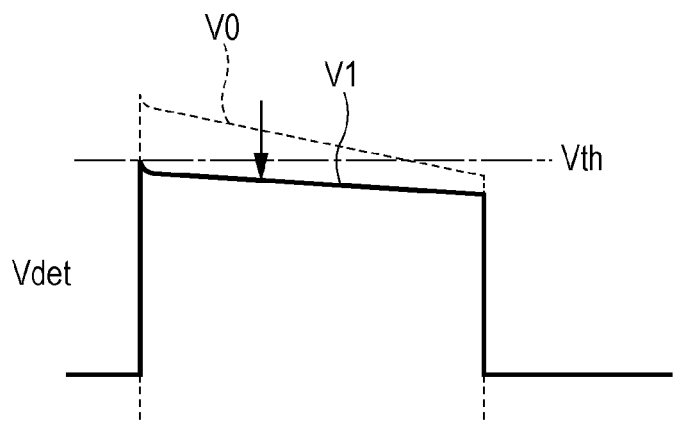
FIGS. 3A and 3B illustrate exemplary waveforms of a driving signal and a touch detection signal that are consistent with the present invention.
Figure 3B:

Hereinafter, embodiments of the present invention will be described in detail and with reference to the drawings. The description will proceed in the following order.
1. Basic principle of capacitive touch detection
2. First Embodiment
3. Second Embodiment
4. Third Embodiment
5. Applications 1. Basic Principle of Capacitive Touch Detection First, the basic principle of the touch detection technique used in a display apparatus with touch detection functions in accordance with an embodiment of the present invention will be described with reference to FIGS. 1A to 3B. This touch detection technique is realized as a capacitive touch sensor, with a capacitor being formed by sandwiching a dielectric D between a pair of electrodes disposed opposite each other (i.e., the driving electrode E1 and the touch detection electrode E2), as illustrated by way of example in FIG. 1A. This structure is expressed as the equivalent circuit illustrated in FIG. 1B. By means of the driving electrode E1, the touch detection electrode E2, and the dielectric D, the capacitor C1 is formed. One end of the capacitor C1 is connected to an AC signal source (i.e., a driving signal source) S, while the other end P is both grounded via a resistor R and also connected to a voltage detector (i.e., a touch detection circuit) DET. When an AC square wave Sg (see FIG. 3B) of predetermined frequency (approximately several kHz to over 10 kHz, for example) is applied from the AC signal source S to the driving electrode E1 (i.e., the first end of the capacitor C1), an output waveform (i.e., the touch detection signal Vdet) like the waveform in FIG. 3A appears at the touch detection electrode E2 (i.e., the other end P of the capacitor C1). Herein, the AC square wave Sg is equivalent to the driving signal Vcom later described.

Figure 1B:
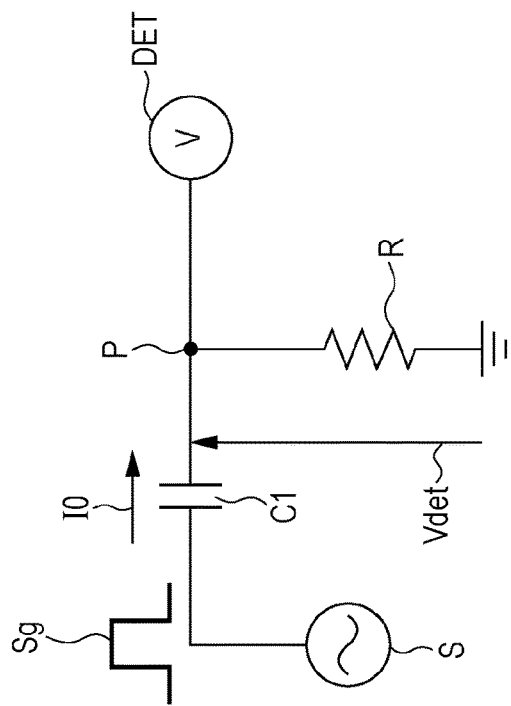
Figure 2A:
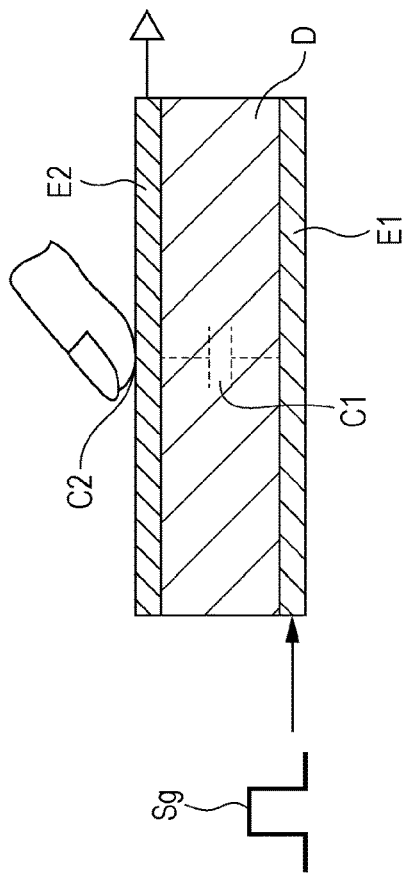
FIGS. 2A and 2B illustrate a state when a finger is in contact or near-contact with a display apparatus with touch detection functions that is consistent with the present invention.
Figure 2B:
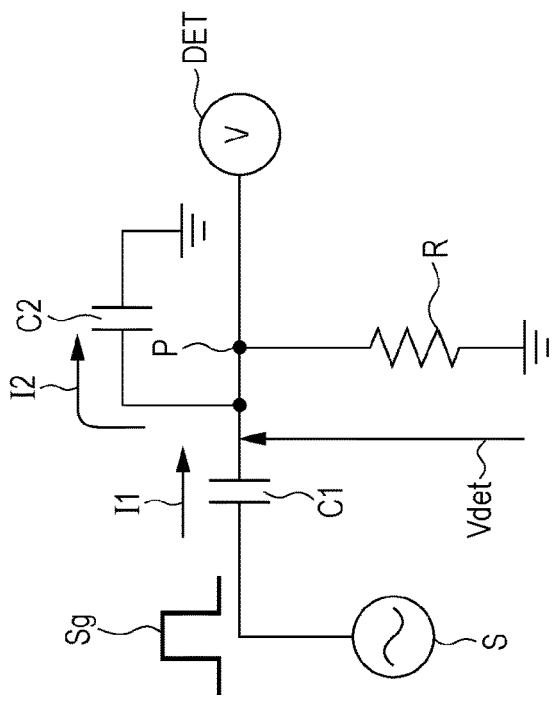

While in the state where a finger is not in contact (or near-contact), a current I0 corresponding to the capacitance of the capacitor C1 flows as the capacitor is charged and discharged, as illustrated in FIG. 1B. At this point, the potential waveform at the other end P of the capacitor C1 becomes like the waveform V0 in FIG. 3A, for example, and is detected by the voltage detector DET.

In contrast, while in the state where a finger is in contact (or near-contact), a capacitor C2 formed by the finger is added in series with the capacitor C1. In this state, respective currents I1 and I2 flow as the capacitors C1 and C2 are charged and discharged. At this point, the potential waveform at the other end P of the capacitor C1 becomes like the waveform V1 in FIG. 3A, and is detected by the voltage detector DET. At this point, the potential at the point P is a partial potential determined by the values of the currents I1 and I2 flowing through the capacitors C1 and C2. For this reason, the waveform V1 takes a smaller value than the waveform V0 in the non-contacting state. The voltage detector DET compares the detected voltage to a predetermined threshold voltage Vth, and determines that the sensor is in a non-contacting state if the detected voltage is equal to or greater than the threshold voltage. In contrast, the voltage detector DET determines that the sensor is in a contacting state if the detected voltage is less than the threshold voltage. In this way, touch detection becomes possible.

2. First Embodiment

[Exemplary Configuration]
(Exemplary Overall Configuration)

Figure 4:
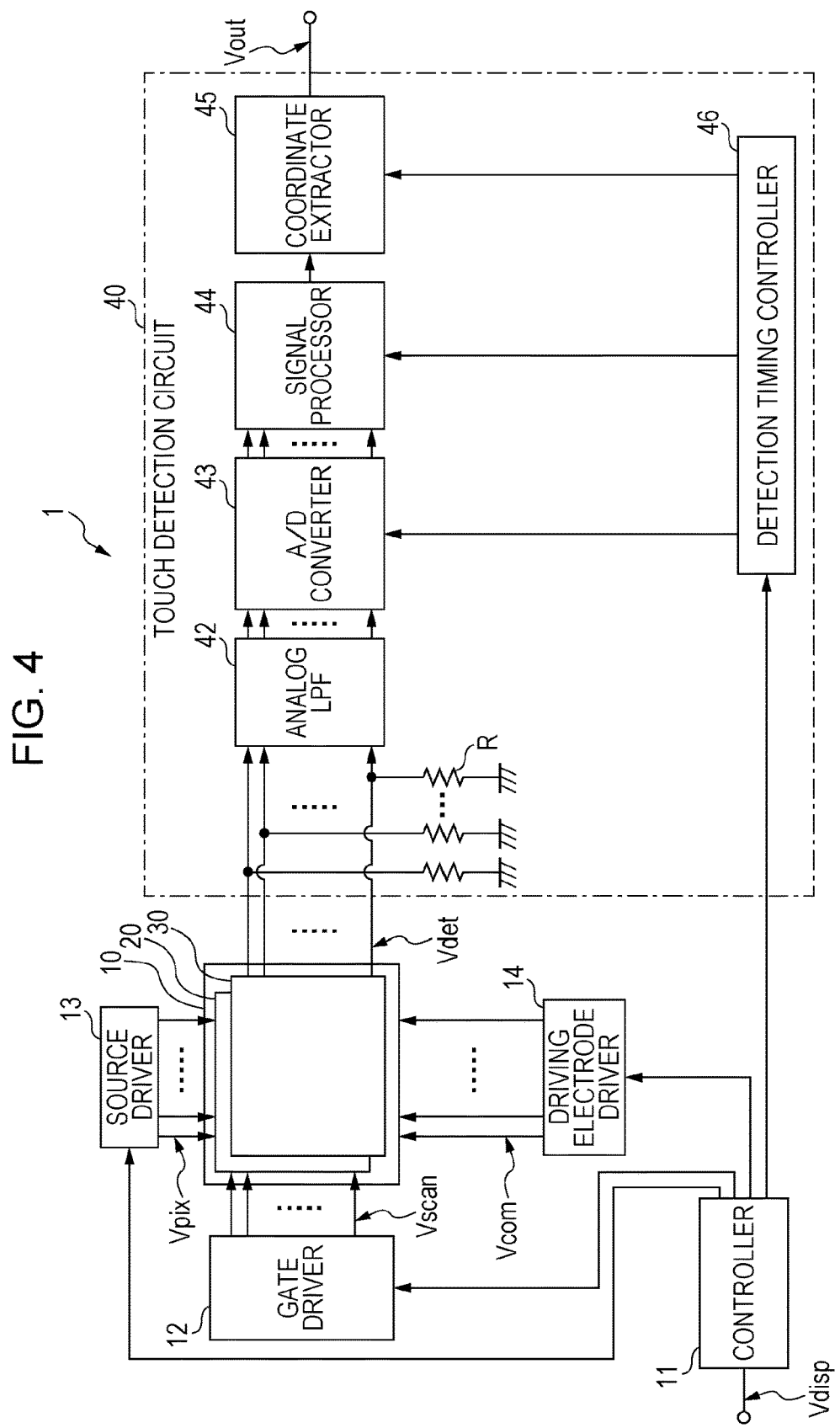
FIG. 4 is a block diagram illustrating one configuration of a display apparatus with touch detection functions that is consistent with the present invention.

FIG. 4 illustrates an exemplary configuration of a display apparatus with touch detection functions in accordance with a first embodiment of the present invention. The display apparatus with touch detection functions uses liquid crystal elements as display elements, with the liquid crystal device formed by the liquid crystal elements being integrated with the capacitive touch detection device. In other words, the display apparatus with touch detection functions herein is what is referred to as an "in-cell" touch apparatus.

The display apparatus with touch detection functions 1 is provided with a display device with touch detection functions 10, a controller 11, a gate driver 12, a source driver 13, a driving electrode driver 14, and a touch detection circuit 40.

In one embodiment that is consistent with the present invention, the display device with touch detection functions 10 is a display device with built-in touch detection functions, and may be a landscape display device. The display device with touch detection functions 10 includes a liquid crystal display (LCD) device 20 and a touch-detecting device 30. As described later, the LCD device 20 displays an image by sequentially scanning one horizontal line at a time in accordance with gate signals supplied from the gate driver 12. The touch-detecting device 30 operates on the basic principle of capacitive touch detection as described earlier, and outputs touch detection signals Vdet. The touch-detecting device 30 is configured to detect touch by sequentially monitoring touch in one detection line at a time in accordance with the driving electrode driver 14 scanning the driving electrodes. As described later, the display device with touch detection functions 10 is configured such that the direction in which the horizontal lines are sequentially monitored one line at a time for display operation differs from the direction in which the detection lines are sequentially scanned one line at a time for touch detection operation.

The controller is a circuit that supplies respective control signals to the gate driver 12, the source driver 13, the driving electrode driver 14, and the touch detection circuit 40, on the basis of an externally supplied display signal Vdisp. The controller 11 performs control such that the above components operate in synchronization with each other.

The gate driver 12 includes functions for sequentially selecting single horizontal lines targeted for display driving by the LCD device 20, on the basis of a control signal supplied from the controller 11. More specifically, the gate driver 12 applies scan signals Vscan via scan signal lines GCL to the gates of the TFT elements Tr of pixels Pix (described hereinafter). In so doing, single rows (i.e., single horizontal lines) of the pixels Pix arrayed in a matrix in the LCD device 20 become sequentially selected as display driving targets.

The source driver 13 is a circuit that supplies pixel signals Vpix to respective pixels Pix within the LCD device 20, on the basis of a control signal supplied by the controller 11. More specifically, the source driver 13 respectively supplies pixel signals Vpix via pixel signal lines SGL to each of the pixels Pix constituting a single horizontal line that is sequentially selected by the gate driver 12, as described later. The pixels Pix are configured such that part of an image is displayed on the single horizontal line in response to the supplied pixel signals Vpix.

The driving electrode driver 14 is a circuit that supplies driving signals Vcom to the driving electrodes COML of the display device with touch detection functions 10, on the basis of a control signal supplied by the controller 11. More specifically, during the period when the display device with touch detection functions 10 displays an image (i.e., the display period), the driving electrode driver 14 applies driving signals Vcom set as display driving signals to all driving electrodes COML. In contrast, during the period when touch detection is carried out (i.e., the touch detection period), the driving electrode driver 14 sequentially applies driving signals Vcom set as pulsed touch driving signals to the driving electrodes COML in the display device with touch detection functions 10. In so doing, single detection lines are sequentially selected as touch detection targets for the touch-detecting device 30. The touch-detecting device 30 is configured to output one touch detection signal Vdet for each detection line from the plurality of touch detection electrodes TDL (described hereinafter), and supply the touch detection signals Vdet to the touch detection circuit 40. In this example, the driving signals Vcom during the display period (i.e., the display driving signals) are DC signals set at 0 V, while the pixel signals Vpix are configured such that their polarities are inverted with respect to their neighboring pixels Pix, as described later. In other words, in this example, the LCD device 20 is driven by a dot inversion pattern.

The touch detection circuit 40 is a circuit that detects the presence or absence of touch with respect to the touch-detecting device 30, and computes information such as the touch panel coordinates of a detected touch. The touch detection circuit 40 operates on the basis of a control signal supplied by the controller 11, as well as the touch detection signals Vdet supplied by the touch-detecting device 30. The touch detection circuit 40 includes an analog low pass filter (LPF) 42, an A/D converter 43, a signal processor 44, a coordinate extractor 45, and a detection timing controller 46. The analog LPF 42 is an analog low pass filter that takes the touch detection signals Vdet supplied by the touch-detecting device 30 as input, removes the high-frequency components (i.e., noise components) contained in the touch detection signals Vdet, retrieves the touch components therefrom, and respectively outputs the results. Between each of the input terminals of the analog LPF 42 and ground, there is connected a resistor R for providing a DC potential (0 V). It should also be appreciated that switches may be provided instead of the resistors R, for example, with the switches configured to provide a DC potential (0 V) as a result of being switched to an ON state at a predetermined time. The A/D converter 43 is a circuit that converts the analog signals output from the analog LPF 42 into digital signals. The signal processor 44 is a logic circuit that detects the presence or absence of touch with respect to the touch-detecting device 30, on the basis of the output signals from the A/D converter 43. The coordinate extractor 45 is a logic circuit that computes the touch panel coordinates of a detected touch when touch is detected in the signal processor 44. The detection timing controller 46 is configured to perform control such that the above circuits operate in synchronization.

Figure 5A:
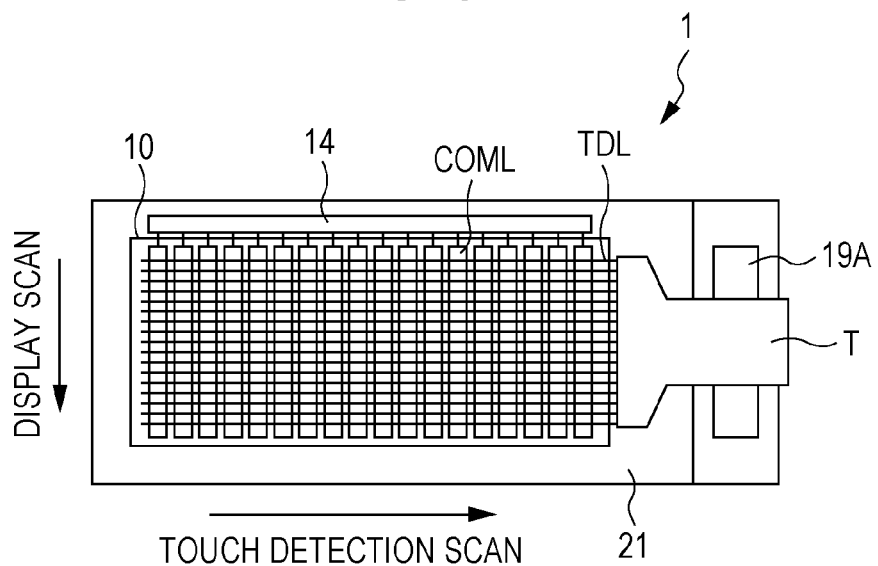
FIGS. 5A and 5B are schematic diagrams illustrating a mounting the display apparatus with touch detection functions that is consistent with the present invention.
Figure 5B:
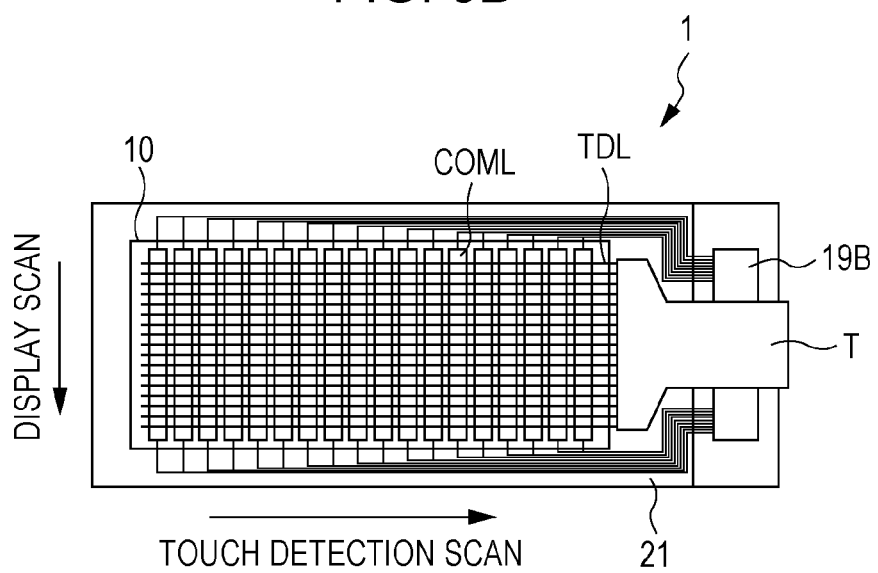

FIGS. 5A and 5B schematically illustrate mounting the display apparatus with touch detection functions 1 into a module. FIG. 5A illustrates the case of forming the driving electrode driver 14 on top of a glass substrate. FIG. 5B illustrates the case of embedding the driving electrode driver 14 into a chip-on-glass (COG).

In FIG. 5A, the module includes the display device with touch detection functions 10, the driving electrode driver 14, and a chip-on-glass (COG) 19A. In this example, the display device with touch detection functions 10 is a landscape display. The representation of the display device with touch detection functions 10 in FIGS. 5A and 5B schematically illustrates driving electrodes COML, as well as touch detection electrodes TDL formed intersecting the driving electrodes COML. In other words, the driving electrodes COML are formed extending in the short-edge direction of the display device with touch detection functions 10, while the touch detection electrodes TDL are formed extending in the long-edge direction of the display device with touch detection functions 10. The output terminals of the touch detection electrodes TDL are provided along the short edge on one side of the display device with touch detection functions 10, and are connected to an externally-mounted touch detection circuit 40 via a terminal T realized by means of a flexible substrate or similar technology. The driving electrode driver 14 is formed on the TFT substrate 21, a glass substrate. The COG 19A is a chip mounted on the TFT substrate 21, and houses various circuits related to display operation, such as the controller 11, the gate driver 12, and the source driver 13 illustrated in FIG. 4. In FIG. 5B, the module includes a COG 19B. In addition to the various circuits related to display operation described above, the COG 19B additionally houses the driving electrode driver 14.

As described later, when the display apparatus with touch detection functions 1 carries out display operation, line-sequential scanning is conducted one horizontal line at a time. In other words, in the display apparatus with touch detection functions 1, a display scan is conducted while moving down along the short edge of the display device with touch detection functions 10 (i.e., the vertical direction in FIGS. 5A and 5B). In contrast, when carrying out touch detection operation, line-sequential scanning is conducted one detection line at a time by successively applying driving signals Vcom to the driving electrodes COML. In other words, in the display apparatus with touch detection functions 1, a touch detection operation is conducted while moving across along the long edge of the display device with touch detection functions 10 (i.e., the horizontal direction in FIGS. 5A and 5B) while the driving electrodes are driven by the driving unit.

In the display apparatus with touch detection functions 1, the touch detection signals Vdet are output from the short edge on one side of the display device with touch detection functions 10. In so doing, the number of touch detection electrodes TDL can be decreased in the display apparatus with touch detection functions 1, and circuit pattern routing becomes simple when connecting the touch detection electrodes TDL to the touch detection circuit 40 via the terminal T.

(Display Device with Touch Detection Functions 10)

An exemplary configuration of the display device with touch detection functions 10 will now be described in detail.

FIG. 6 illustrates an example of the primary cross-sectional structure of the display device with touch detection functions 10. The display device with touch detection functions 10 is provided with: a pixel substrate 2; a counter substrate 3 disposed facing the pixel substrate 2; and a liquid crystal layer 6 inserted between the pixel substrate 2 and the counter substrate 3.

The pixel substrate 2 includes: a TFT substrate 21 that acts as a circuit substrate; and a plurality of pixel electrodes 22 disposed in a matrix on top of the TFT substrate 21. Although not illustrated in FIG. 6, a thin film transistor (TFT) for each pixel is formed on the TFT substrate 21, as well as other circuit pattern lines, such as pixel signal lines SGL that supply the pixel signals Vpix to each pixel electrode 22, and scan signal lines GCL that drive each TFT.

The counter substrate 3 includes: a glass substrate 31; a color filter 32 formed on one surface of the glass substrate 31; and a plurality of driving electrodes COML formed on top of the color filter 32. The color filter 32 may be a periodic arrangement of tricolor red (R), green (G), and blue (B) color filter layers, with one tricolor set (R, G, B) being associated with each display pixel. The driving electrodes COML function as common driving electrodes for the LCD device 20, while additionally functioning as driving electrodes for the touch-detecting device 30. The driving electrodes COML are joined to the TFT substrate 21 by means of conductive post contacts not illustrated in FIG. 6. Via these conductive post contacts, driving signals Vcom set as AC square waves are applied from the TFT substrate 21 to the driving electrodes COML. Although FIG. 6 illustrates the driving electrodes COML as corresponding to two pixel electrodes 22 each, it should be appreciated that the configuration is not limited thereto. For example, each of the driving electrodes COML may also correspond to one pixel electrode 22, or to three or more pixel electrodes 22. On the opposite surface of the glass substrate 31, there are formed touch detection electrodes TDL, which act as the detection electrodes for the touch-detecting device 30. Additionally, a polarizing film 35 is disposed on top of the touch detection electrodes TDL.

The liquid crystal layer 6 modulates light passing through the layer according to the state of an electric field. Various liquid crystal modes may be used for the liquid crystal layer 6, such as twisted nematic (TN), vertical alignment (VA), or electrically controlled birefringence (ECB), for example.

It should be appreciated that alignment films are respectively disposed between the liquid crystal layer 6 and the pixel substrate 2, and between the liquid crystal layer 6 and the counter substrate 3. Also, a rear polarizing film is disposed underneath the pixel substrate 2. However, these layers have been omitted from illustration in FIG. 6.

Figure 7:
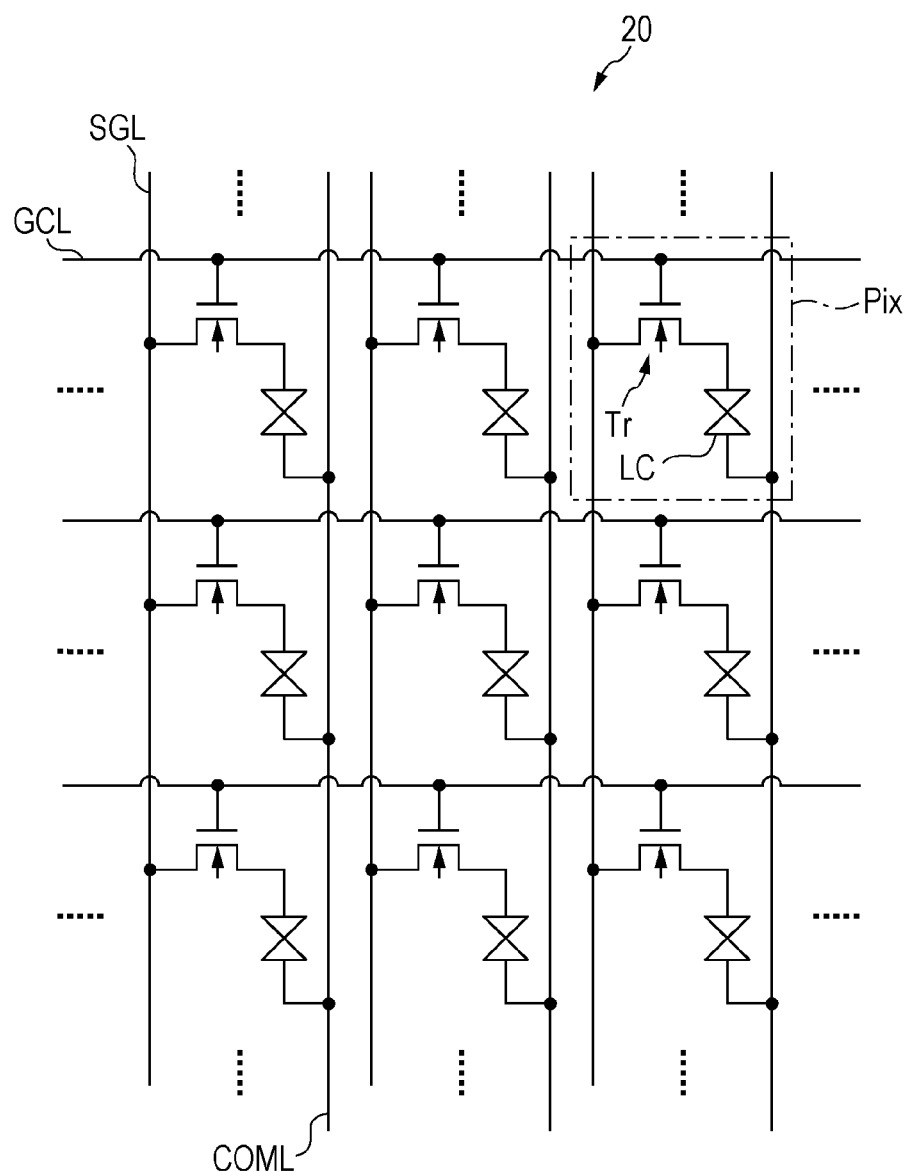
FIG. 7 is a circuit diagram illustrating the pixel layout of the display device with touch detection functions that is consistent with the present invention.

FIG. 7 illustrates an exemplary configuration of the pixel structure in the LCD device 20. The LCD device 20 includes a plurality of pixels Pix arranged in a matrix. Each pixel Pix includes a TFT element Tr and a liquid crystal element LC. The TFT element Tr is realized by means of a thin film transistor. In this example, the TFT element Tr is realized by means of an n-channel metal oxide semiconductor (MOS). The source of each TFT element Tr is connected to one of the pixel signal lines SGL. The gate is connected to one of the scan signal lines GCL. The drain is connected to one end of the liquid crystal element LC. One end of each liquid crystal element LC is connected to the drain of the TFT element Tr, and the other end is connected to one of the driving electrodes COML.

Each pixel Pix is connected to the other pixels Pix belonging to the same row in the LCD device 20 by means of one of the scan signal lines GCL. Each scan signal line GCL is connected to the gate driver 12, and is supplied with a scan signal Vscan by the gate driver 12. Each pixel Pix is also connected to the other pixels Pix belonging to the same column in the LCD device 20 by means of one of the pixel signal lines SGL. Each pixel signal line SGL is connected to the source driver 13, and is supplied with a pixel signal Vpix by the source driver 13.

Additionally, each pixel Pix is connected to the other pixels Pix belonging to the same column in the LCD device 20 by means of one of the driving electrodes COML. Each driving electrode COML is connected to the driving electrode driver 14, and is supplied with a driving signal Vcom by the driving electrode driver 14. In other words, in this example, the driving electrodes COML are formed extending in the same direction as the pixel signal lines SGL, and a plurality of pixels Pix belonging to the same column is configured to share a single driving electrode COML. However, as illustrated in FIG. 6, it should also be appreciated that a plurality of pixels Pix belonging to multiple columns (in FIG. 6, two columns) may be configured to share a single driving electrode COML.

With this configuration, the gate driver 12 in the LCD device 20 drives pixels such that time-division, line-sequential scanning of the scan signal lines GCL is conducted. In so doing, single horizontal lines are sequentially selected, and the source driver 13 provides pixel signals Vpix to the pixels Pix belonging to one of the horizontal lines. As a result, an image is displayed one horizontal line at a time. When carrying out this display operation, the driving electrode driver 14 is configured to apply a common voltage (in this example, 0 V) to all of the driving electrodes COML.

Figure 8:
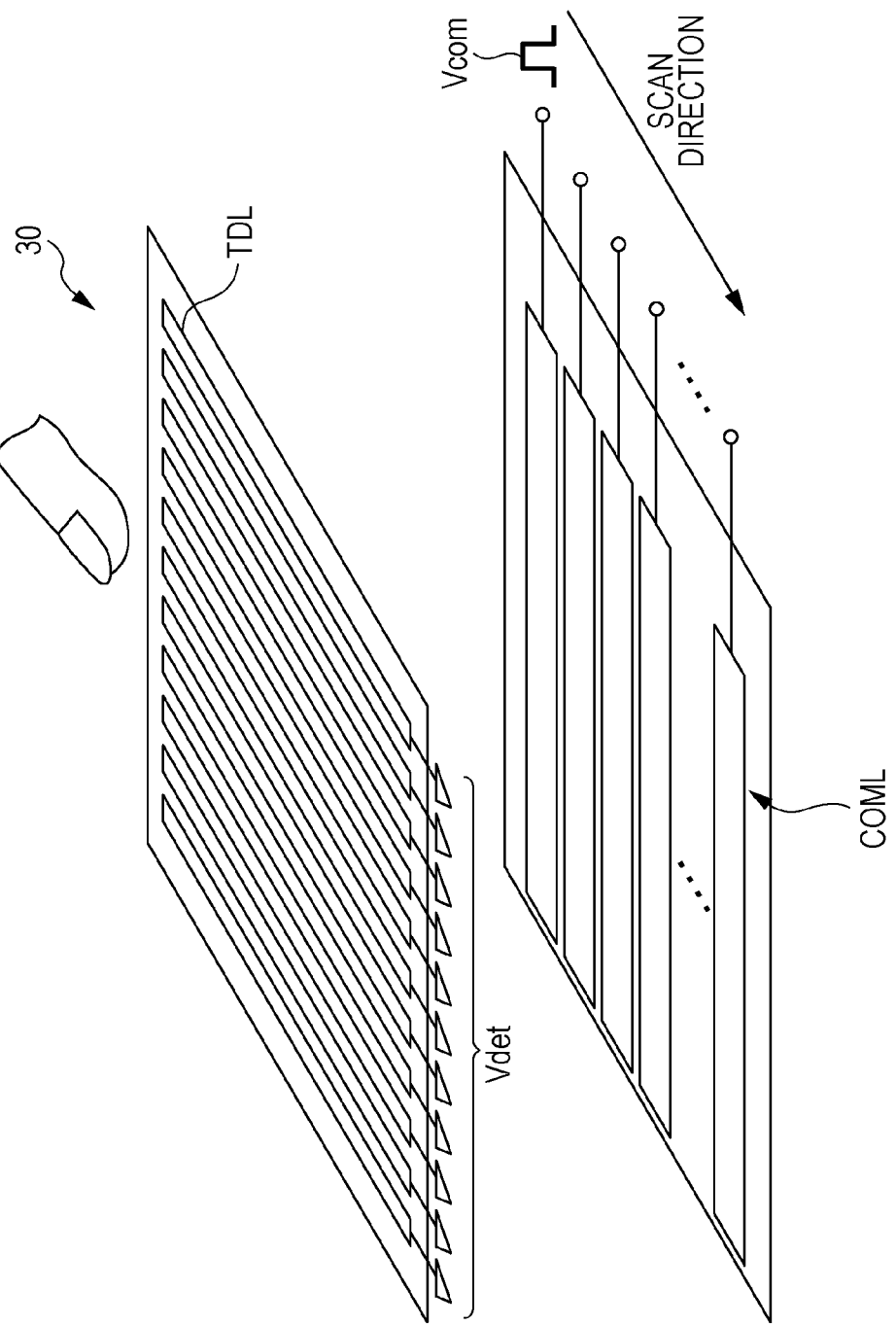
FIG. 8 is a perspective view illustrating driving electrodes and touch detection electrodes in the display device with touch detection functions that is consistent with the present invention.

FIG. 8 is a perspective view illustrating one exemplary configuration of the touch-detecting device 30. The touch-detecting device 30 is realized by means of the driving electrodes COML and the touch detection electrodes TDL provided in the counter substrate 3. The driving electrodes COML are divided into a striped electrode pattern, with the plurality of stripes extending in the horizontal direction in FIG. 8. During the touch detection period, the stripes in the electrode pattern are sequentially supplied with driving signals Vcom by the driving electrode driver 14, and time-division, line-sequential scanning as described later is conducted. The touch detection electrodes TDL are also realized in a striped electrode pattern, but with the plurality of stripes extending in the direction orthogonal to that of the stripes in the electrode pattern of the driving electrodes COML. The stripes in the electrode pattern of the touch detection electrodes TDL are respectively connected to the inputs of the analog LPF 42 in the touch detection circuit 40. The intersecting electrode patterns between the driving electrodes COML and the touch detection electrodes TDL form a capacitor at each intersection site.

With this configuration, the driving electrode driver 14 drives the driving electrodes COML in the touch-detecting device 30 so as to conduct time-division, line-sequential scanning during the touch detection period. In so doing, single detection lines are sequentially selected, and a touch detection signal Vdet is output from each touch detection electrode TDL. As a result, touch is detected on each detection line. In other words, each of the driving electrodes COML corresponds to the driving electrode E1 in the basic principle of touch detection illustrated in FIGS. 1A to 3B, while each of the touch detection electrodes TDL corresponds to the touch detection electrode E2. The touch-detecting device 30 follows is thus configured to detect touch according to this basic principle. As illustrated in FIG. 8, the intersecting electrode patterns form a matrix of capacitive touch sensors. Consequently, it becomes possible to detect the position where contact or near-contact with an external proximate object has occurred.

Herein, the pixel signal lines SGL correspond to a single specific example of signal lines in accordance with an embodiment of the present invention. The driving electrodes COML correspond to a single specific example of common driving electrodes in accordance with an embodiment of the present invention. The liquid crystal elements LC correspond to a single specific example of a plurality of display elements in accordance with an embodiment of the present invention. The source driver 13 and the driving electrode driver 14 correspond to a single specific example of a driving unit in accordance with an embodiment of the present invention. The touch detection circuit 40 corresponds to a single specific example of a detection processor in accordance with an embodiment of the present invention.

[Operation and Behavior]

Next, the operation and behavior of a display apparatus with touch detection functions 1 in accordance with an embodiment of the present invention will be described.

(Summary of Overall Operation)

On the basis of an externally supplied display signal Vdisp, the controller 11 supplies respective control signals to the gate driver 12, the source driver 13, the driving electrode driver 14, and the touch detection circuit 40, and performs control such that these components operate in synchronization with each other. On the basis of the control signal supplied by the controller 11, the gate driver 12 supplies scan signals Vscan to the LCD device 20, and sequentially selects single horizontal lines targeted for display operation. On the basis of the control signal supplied by the controller 11, the source driver 13 supplies pixel signals Vpix to each pixel Pix constituting a single horizontal line selected by the gate driver 12. On the basis of the control signal supplied by the controller 11, the driving electrode driver 14 applies driving signals Vcom set as display driving signals (i.e., 0 V DC signals) to all driving electrodes COML during the display period. During the touch detection period, the driving electrode driver 14 successively applies driving signals Vcom set as pulsed touch driving signals to the driving electrodes COML, thereby sequentially selecting single detection lines. During the display period, the display device with touch detection functions 10 carries out display operation on the basis of signals supplied by the gate driver 12, the source driver 13, and the driving electrode driver 14. During the touch detection period, the display device with touch detection functions 10 carries out touch detection operation on the basis of signals supplied by the driving electrode driver 14, and outputs touch detection signals Vdet from the touch detection electrodes TDL. The analog LPF 42 removes the high-frequency components from the touch detection signals Vdet, and outputs the results. The A/D converter 43 converts the analog signals output from the analog LPF 42 into digital signals. On the basis of the output signals from the A/D converter 43, the signal processor 44 detects the presence or absence of touch. When touch is detected in the signal processor 44, the coordinate extractor 45 computes the touch panel coordinates of the detected touch. The detection timing controller 46 performs control such that the analog LPF 42, the A/D converter 43, the signal processor 44, and the coordinate extractor 45 operate in synchronization with each other.

(Exemplary Detailed Operation)

Figure 9:
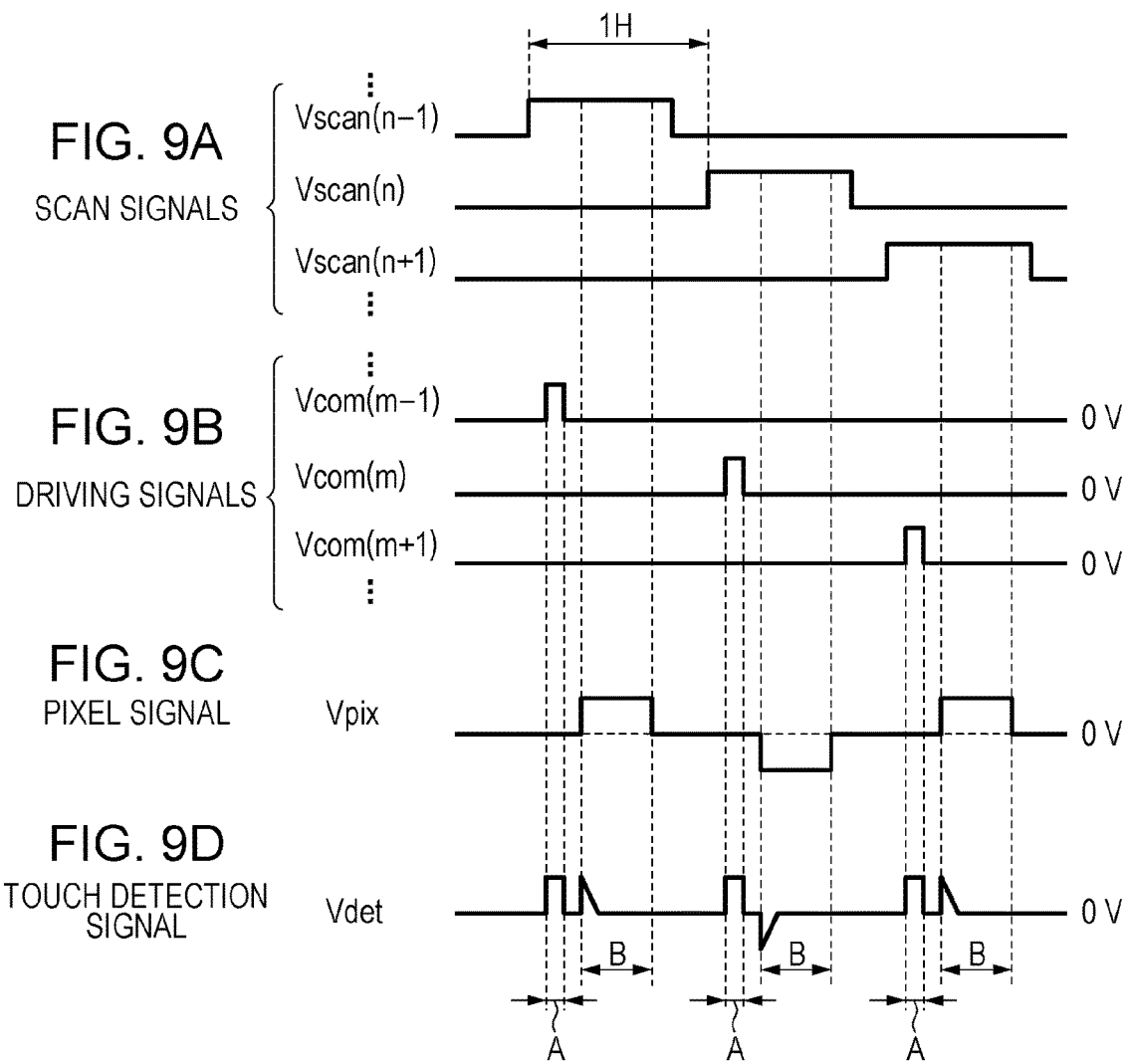
FIGS. 9A to 9D are timing waveform diagrams of the display apparatus with touch detection functions that is consistent with the present invention.

FIGS. 9A to 9D illustrate exemplary detailed operation of the display apparatus with touch detection functions 1. FIG. 9A illustrates waveforms of the scan signals Vscan. FIG. 9B illustrates waveforms of the driving signals Vcom. FIG. 9C illustrates a waveform of a pixel signal Vpix. FIG. 9D illustrates a waveform of a touch detection signal Vdet.

Herein, the scan signals Vscan illustrated in FIG. 9A correspond to the adjacent (n−1)th, nth, and (n+1)th rows of the scan signal lines GCL. Similarly, the driving signals Vcom illustrated in FIG. 9B correspond to the adjacent (m−1)th, mth, and (m+1)th columns of the driving electrodes COML.

In the display apparatus with touch detection functions 1, touch detection operation (i.e., a touch detection period A) and display operation (i.e., a display period B) are conducted by time division during each horizontal display period (1H). With the touch detection operation, touch detection operation is conducted by selecting a different driving electrode COML and applying a driving signal Vcom during each horizontal display period (1H). Hereinafter, this touch detection operation will be described in detail.

First, the gate driver 12 applies a scan signal Vscan to the scan signal line GCL on the (n−1)th row, and the scan signal Vscan(n−1) changes from low level to high level (FIG. 9A). In so doing, a single horizontal display period (1H) starts.

Next, during the touch detection period A, the driving electrode driver 14 applies a driving signal Vcom to the driving electrode COML on the (m−1)th column, and the driving signal Vcom(m−1) changes from low level to high level (FIG. 9B). This driving signal Vcom(m−1) propagates to the touch detection electrode TDL via one of the capacitors, and the touch detection signal Vdet changes (FIG. 9D). Next, once the driving signal Vcom(m−1) changes from high level to low level (FIG. 9B), the touch detection signal Vdet similarly changes (FIG. 9D). The waveform of the touch detection signal Vdet during the touch detection period A corresponds to that of the touch detection signal Vdet in the basic principle of touch detection described earlier (see FIG. 3A). The A/D converter 43 detects touch by A/D converting the touch detection signal Vdet during this touch detection period A. In so doing, touch is detected on a single detection line in the display apparatus with touch detection functions 1.

Next, during the display period B, the source driver 13 applies a pixel signal Vpix to one of the pixel signal lines SGL (FIG. 9C), and displays part of an image on a single horizontal line. As illustrated in FIG. 9D, changes in the pixel signal Vpix propagate to the touch detection electrode TDL via parasitic capacitance. Thus, although the touch detection signal Vdet may be susceptible to change, the effects of the pixel signal Vpix on touch detection can be suppressed by configuring the A/D converter 43 to not conduct A/D conversion during the display period B. Once the source driver 13 finishes supplying the pixel signal Vpix, the gate driver 12 changes the scan signal Vscan(n−1) for the scan signal line GCL on the (n−1)th row from high level to low level (FIG. 9A), and the current horizontal display period (1H) ends.

Next, the gate driver 12 applies a scan signal Vscan to the scan signal line GCL on the nth row (i.e., a row different from the row described above), and the scan signal Vscan(n) changes from low level to high level (FIG. 9A). In so doing, the next horizontal display period (1H) starts.

During the touch detection period A, the driving electrode driver 14 applies a driving signal Vcom to the driving electrode COML on the mth column (i.e., a column different from the column described above) (FIG. 9B). The A/D converter 43 then A/D converts the resulting change in the touch detection signal Vdet (FIG. 9D). In so doing, touch is detected on the current detection line.

Next, during the display period B, the source driver 13 applies a pixel signal Vpix to the pixel signal line SGL (FIG. 9C), and displays part of an image on a single horizontal line. Note that in this example, since the display apparatus with touch detection functions 1 is driven according to a dot inversion pattern, the pixel signal Vpix applied by the source driver 13 has an inverted polarity compared to the pixel signal Vpix from the previous horizontal display period. Once this display period B ends, the current horizontal display period ends.

By subsequently repeating the operation described above, the display apparatus with touch detection functions 1 carries out display operation by scanning the entire display screen area, while also carrying out touch detection operation by scanning the entire touch detection screen area.

As described earlier, the display apparatus with touch detection functions 1 operates such that the direction in which the display scan is conducted differs from the direction in which the touch detection operation is conducted. This means that for a given horizontal display period (1H), both display operation and touch detection operation will be carried out for a given pixel Pix. The display apparatus with touch detection functions 1 is configured such that, within a single horizontal display period (1H), touch detection operation is carried out during a touch detection period A, while display operation is carried out during a display period B. In this way, touch detection operation and display operation are configured to be carried out during separate periods. For this reason, both display operation and touch detection operation can be carried out during the same horizontal display period, and the effects of display operation on touch detection can be suppressed.

(Threshold Voltage and Leakage in TFT Elements Tr)

As described above, a touch detection signal Vdet is generated in response to a driving signal Vcom during the touch detection period A. In other words, the touch detection signal Vdet during the touch detection period A can be increased by increasing the amplitude of the driving signal Vcom, and thus it becomes possible to increase the touch panel sensitivity, for example.

When the amplitude of the driving signal Vcom is increased, the threshold voltage and leakage in the TFT elements Tr should be observed with care. In FIG. 7, if a driving signal Vcom with a large amplitude $\Delta V$ is applied to one of the driving electrodes COML, then the drains (i.e., the terminals connected to the liquid crystal elements LC) of the TFT elements Tr in the OFF state will enter a floating state. For this reason, changes in the driving signal Vcom will propagate to the drains of the TFT elements Tr via parasitic capacitance (not illustrated in FIG. 7) existing in parallel with the liquid crystal elements LC, and the voltage will change significantly. More specifically, if the drains of the TFT elements Tr are being kept at the potential of the pixel signal Vpix when the driving signal Vcom is 0 V, then as the driving signal Vcom becomes $\Delta V$, the potential at the drains of the TFT elements Tr will become Vpix+$\Delta V$, for example. Consequently, values such as the amplitude $\Delta V$ should be set such that the drain potential does not exceed the threshold voltage of the TFT elements Tr in cases like the above.

Additionally, although the driving signals Vcom are illustrated as having pulses of positive polarity in FIG. 9B, it is also possible for the driving signals Vcom to have pulses of negative polarity, which is later described as a modification. In this case, the drain potential of the TFT elements Tr becomes Vpix−$\Delta V$, and the leakage of the TFT elements Tr should be observed with care, in addition to the threshold voltage described above. In other words, if an excessively negative voltage is applied to the drains of n-channel TFT elements Tr in the OFF state, and the TFT elements Tr switched ON as a result, then charge will move (i.e., leak) via the TFT elements Tr. This will cause a change in the potential of the pixel signal Vpix at which the TFT elements Tr are held, which could degrade image quality. Consequently, in this case, the gate potential of TFT elements Tr switched to the OFF state should be set low so as to not produce leakage.

In contrast, if the driving signals Vcom are set to have pulses of positive polarity only, as illustrated in FIG. 9B, then increasing the amplitude of the driving signals Vcom will not pose leakage or other problems. For this reason, touch detection functions can be added to LCD devices of the related art that lack touch detection functions, without making large modifications thereto.

Comparative Example

Next, a display apparatus with touch detection functions in accordance with a comparative example will be described. This comparative example illustrates the display apparatus with touch detection functions of the related art disclosed in JP-A-2009-244958 cited earlier. In this comparative example, the touch detection operation direction differs from that of the first embodiment described above. In other words, although the touch detection operation direction and the display scan direction are configured to differ in the first embodiment (FIGS. 5A and 5B), the touch detection operation direction and the display scan direction are instead configured to be the same in this comparative example. Other parts of the configuration are similar to those of the first embodiment (FIGS. 5A and 5B).

Figure 10:
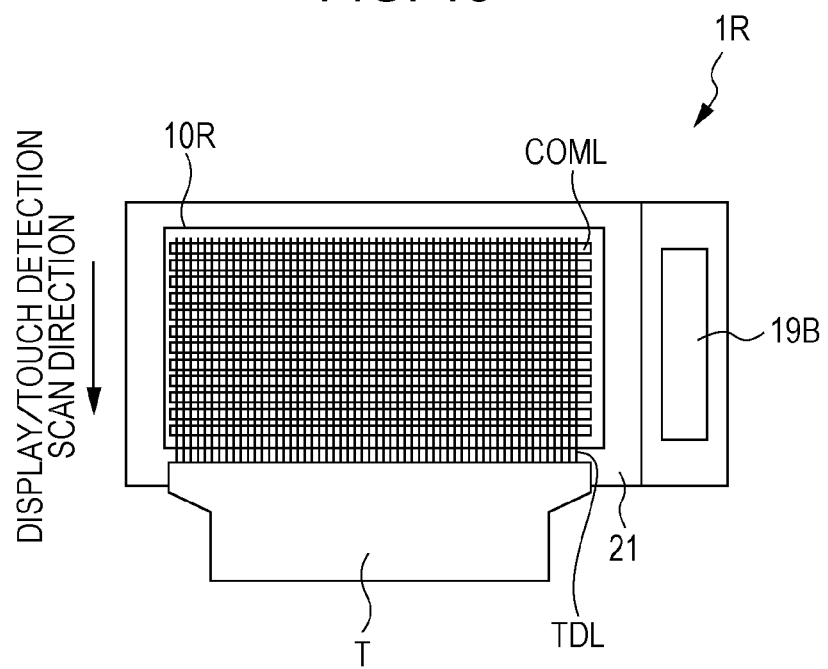
FIG. 10 is a schematic diagram illustrating a mounting a display apparatus with touch detection functions that is consistent with the present invention.

FIG. 10 schematically illustrates mounting a display apparatus with touch detection functions 1R in accordance with a comparative example into a module. The module includes a display device with touch detection functions 10R. The display device with touch detection functions 10R in accordance with a comparative example differs from the display device with touch detection functions 10 in accordance with the first embodiment in that the driving electrodes COML are formed extending in the long-edge direction of the display device with touch detection functions 10R, while the touch detection electrodes TDL are formed extending in the short-edge direction of the display device with touch detection functions 10R.

With this configuration, the display apparatus with touch detection functions 1R in accordance with a comparative example differs from the display apparatus with touch detection functions 1 in accordance with the first embodiment in that a touch detection operation is conducted while moving down along the short-edge direction of the display device with touch detection functions 10R (i.e., the vertical direction in FIG. 10). The touch detection signals Vdet are then output from the long edge on one side of the display device with touch detection functions 10R. As a result, the display apparatus with touch detection functions 1R has an increased number of touch detection electrodes TDL, circuit pattern routing becomes difficult when connecting the touch detection electrodes TDL to the touch detection circuit 40 via the terminal T, and the bezel width is increased along the long edge on one side of the display apparatus with touch detection functions 1R.

In contrast, in the display apparatus with touch detection functions 1 in accordance with the first embodiment, the touch detection signals Vdet are output from the short edge on one side of the display device with touch detection functions 10. For this reason, it is possible to limit increases in the bezel width along the long edge on one side of the display apparatus with touch detection functions 1.

Furthermore, the touch detection signals Vdet often become sensitive to noise, particularly in cases where attempts are made to raise to the touch sensitivity of the display apparatus with touch detection functions. Consequently, it is preferable to keep the circuit pattern lines that transmit the touch detection signals Vdet as short as possible and more resistant to noise. In the display apparatus with touch detection functions 1, the number of touch detection electrodes TDL can be decreased in the case of a landscape display. As a result, circuit pattern routing becomes simple when connecting the touch detection electrodes TDL to the touch detection circuit 40, and the circuit pattern lines can be made shorter and more resistant to noise.

[Advantages]

As described above, in the present embodiment, driving electrodes are formed extending in the short-edge direction of a landscape display device with touch detection functions. For this reason, the touch detection signals Vdet can be retrieved from the short edge on one side of the display device with touch detection functions, and increases in the bezel width in the long-edge direction of the display apparatus with touch detection functions can be suppressed.

The present embodiment is configured such that touch detection operation and display operation are carried out during separate periods within a single horizontal display period. For this reason, both display operation and touch detection operation can be carried out during the same horizontal display period, while in addition, the effects of display operation on touch detection can be suppressed.

In the present embodiment, the driving signals are set to have pulses of positive polarity only. For this reason, touch detection sensitivity can be increased without impairing image quality.

[Modification 1-1]

In the foregoing embodiment, the driving signals Vcom are set to have pulses of positive polarity only, but it should be appreciated that an embodiment of the present invention is not limited thereto. For example, the driving signals Vcom may be set to have pulses of negative polarity only, or to have pulses of both positive and negative polarity. Details are described below.

FIGS. 11A to 11D illustrate exemplary detailed operation for the case when the driving signals Vcom are set to have pulses of negative polarity. As illustrated in FIG. 11B, the driving electrode driver 14 applies driving signals Vcom set as pulses of negative polarity to the driving electrodes COML. In this case, the amplitude of the driving signals Vcom is preferably set within a range that will not switch on the TFT elements Tr, as described earlier. As the voltage changes in one of these driving signals Vcom, a touch detection signal Vdet with negative polarity is produced on one of the touch detection electrodes TDL during the touch detection period A. In this case, the A/D converter 43 is still able to detect touch by A/D converting this touch detection signal Vdet with negative polarity during the touch detection period A.

FIGS. 12A to 12D illustrate exemplary detailed operation for the case when the driving signals Vcom are set to have pulses of both positive and negative polarity. As illustrated in FIG. 12B, the driving electrode driver 14 applies driving signals Vcom set as pulses of both positive and negative polarity to the driving electrodes COML. In this example, the time average of these pulse waveforms is 0 V. In so doing, the time-averaged value of the potential difference between the ends of each liquid crystal element LC can be set to 0 V, and degradation can be minimized when the properties of the liquid crystal elements LC are degraded due to burn-in or other phenomena. In this case, the A/D converter 43 may be configured to detect touch by A/D converting touch detection signals Vdet with negative polarity during the touch detection period A illustrated in FIG. 12D. Alternatively, the A/D converter 43 may be configured to detect touch by A/D converting touch detection signals Vdet with positive polarity.

[Modification 1-2]

Figure 13A:
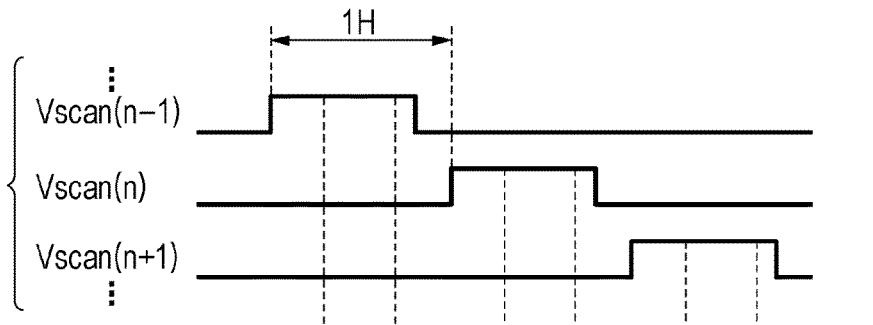
FIGS. 13A to 13D depict timing waveform diagrams of a display apparatus with touch detection functions that is consistent with the present invention.
Figure 13B:
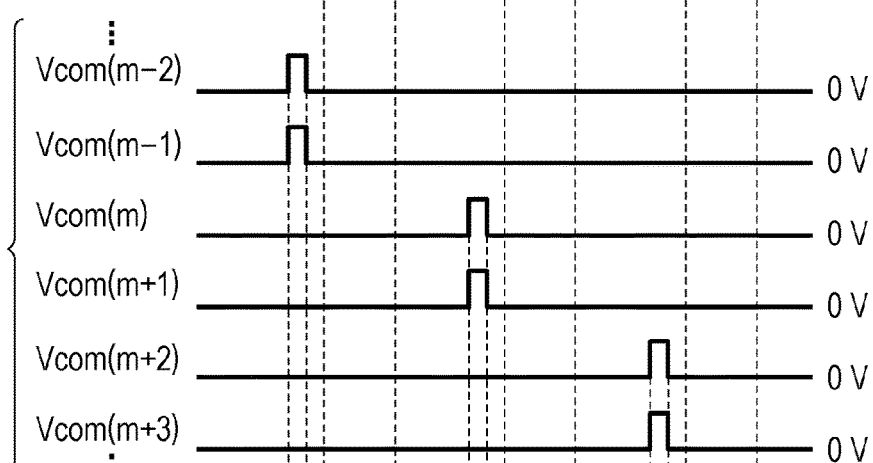
Figure 13C:
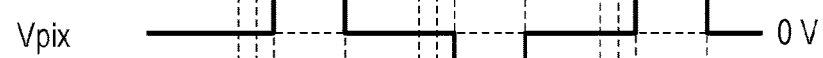
Figure 13D:
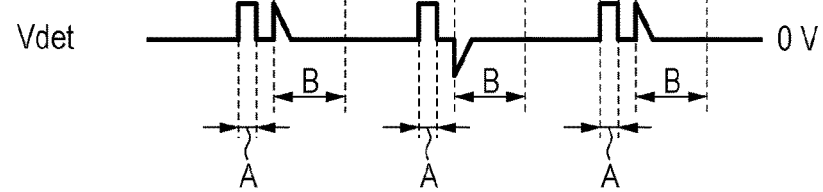

The foregoing embodiment is configured to perform sequential scans by selecting one driving electrode COML at a time, but it should be appreciated that an embodiment of the present invention is not limited thereto. Instead, an embodiment may be configured to perform sequential scans by selecting multiple driving electrodes COML at a time, for example. FIGS. 13A to 13D illustrate exemplary detailed operation for the case when two driving electrodes COML are selected at a time. As illustrated in FIG. 13B, the driving electrode driver 14 simultaneously applies driving signals Vcom to two of the driving electrodes COML during a single horizontal display period. In this case, the A/D converter 43 is still able to detect touch by A/D converting the touch detection signals Vdet during the touch detection period A.

3. Second Embodiment

Next, a display apparatus with touch detection functions in accordance with a second embodiment of the present invention will be described. In the present embodiment, the method for driving the driving electrodes during touch detection operation differs from that of the first embodiment. In other words, although the driving electrode driver 14 is configured to drive the driving electrodes COML in the first embodiment (FIG. 4), the source driver 13 is instead configured to drive the driving electrodes COML via parasitic capacitance between the pixel signal lines SGL and the driving electrodes COML in the present embodiment. Other parts of the configuration are similar to those of the first embodiment (FIG. 4). Herein, identical reference numbers are given to portions of the configuration that are essentially identical to those of the display apparatus with touch detection functions 1 in accordance with the first embodiment, and further description of such portions is omitted as appropriate.

Figure 14:
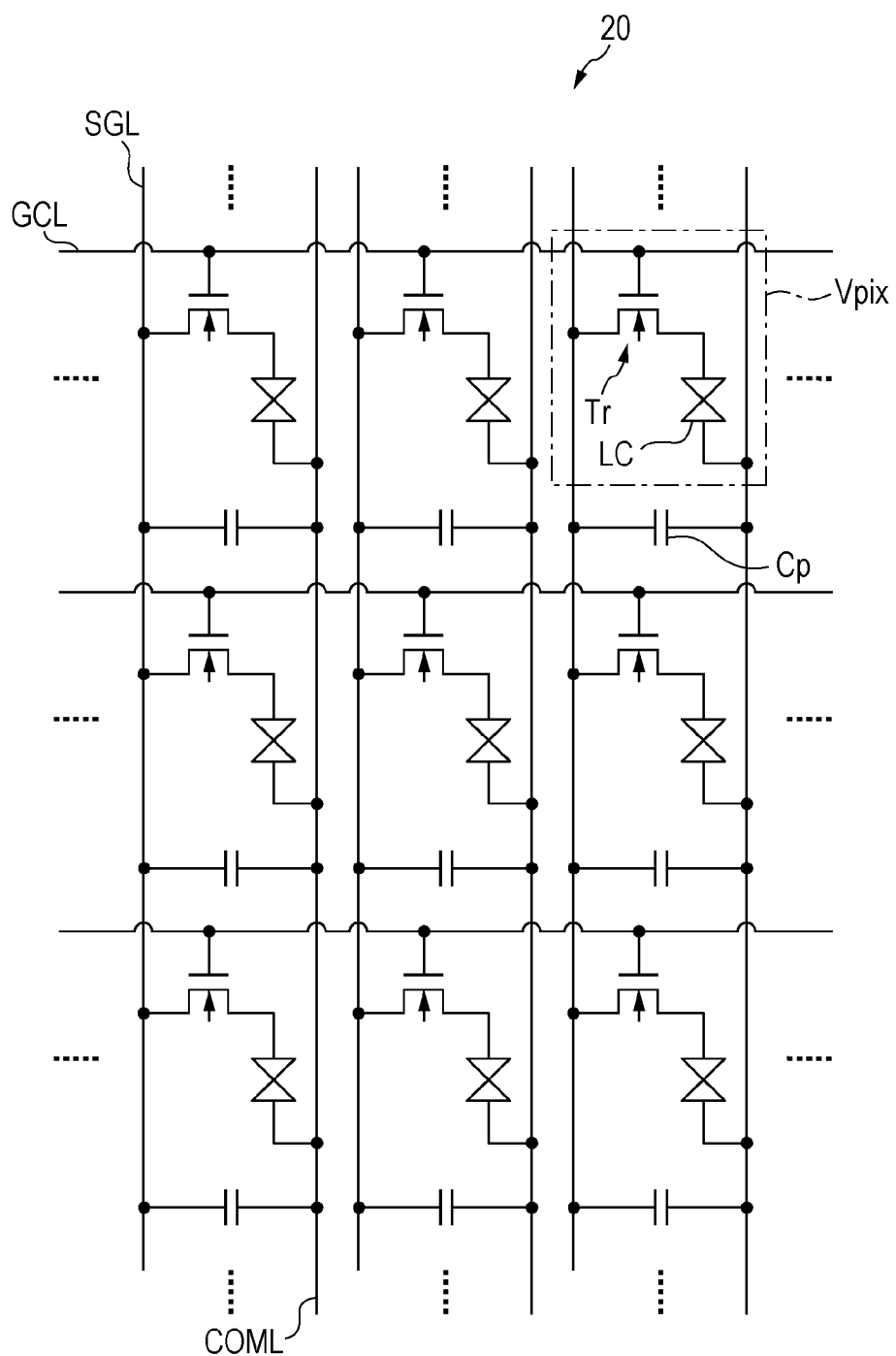
FIG. 14 is a circuit diagram of a display device with touch detection functions that is consistent with the present invention.

FIG. 14 illustrates parasitic capacitance between the pixel signal lines SGL and the driving electrodes COML. Each of the pixel signal lines SGL includes a parasitic capacitors Cp between itself and a corresponding driving electrode COML. As illustrated in FIG. 6, the parasitic capacitors Cp are formed via the liquid crystal layer 6 between the pixel signal lines SGL formed on the TFT substrate 21, and the driving electrodes COML formed on the glass substrate 31. In other words, although FIG. 14 illustrates a parasitic capacitor Cp existing at each pixel Pix for the sake of convenience, in actuality, the parasitic capacitors Cp exist distributed between the pixel signal lines SGL and the driving electrodes COML.

Figure 15:
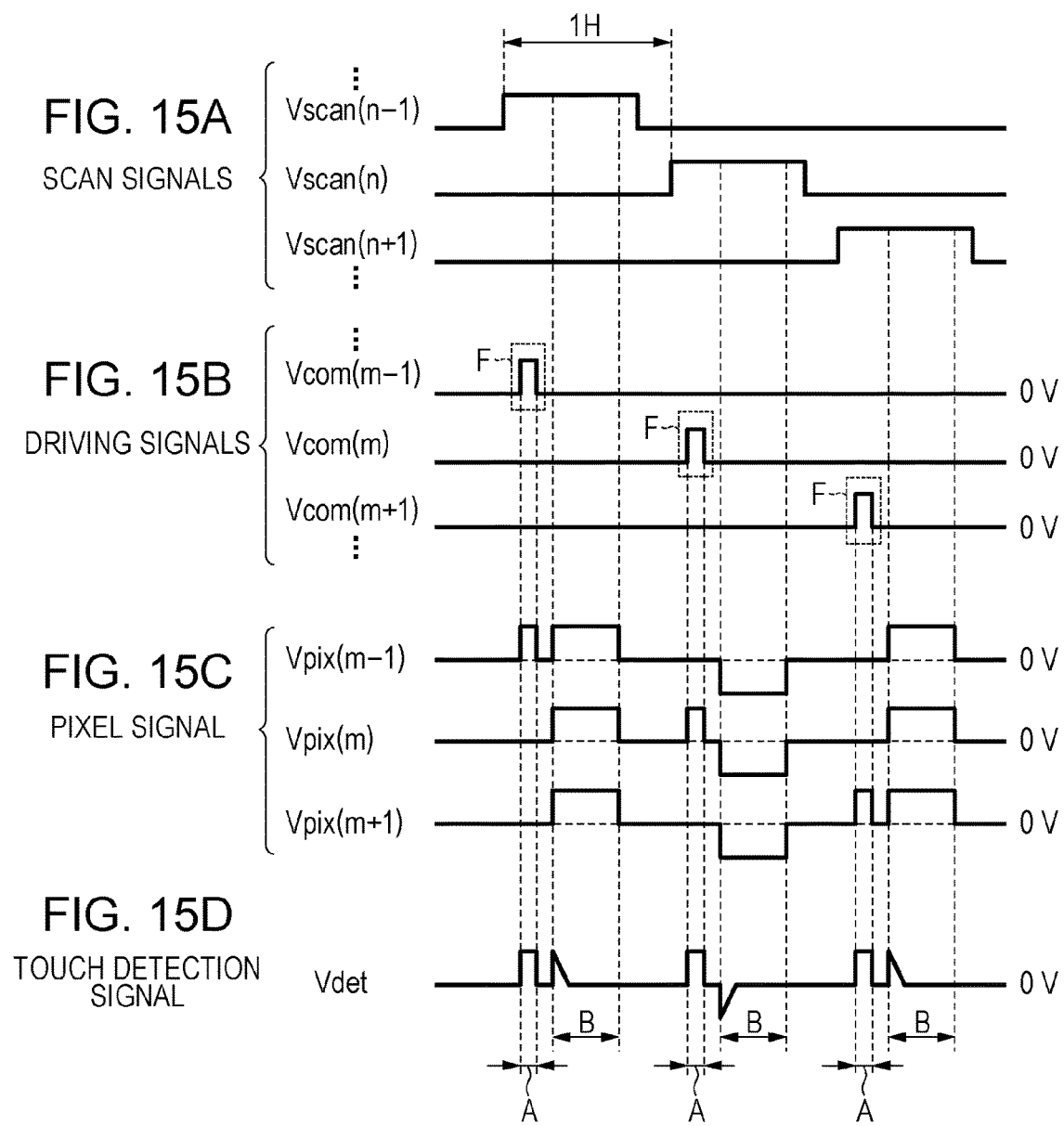
FIGS. 15A to 15D depict timing waveform diagrams of a display apparatus with touch detection functions that is consistent with the present invention.

FIGS. 15A to 15D illustrate exemplary detailed operation of a display apparatus with touch detection functions in accordance with the present embodiment. FIG. 15A illustrates waveforms of the scan signals Vscan. FIG. 15B illustrates waveforms of the driving signals Vcom. FIG. 15C illustrates waveforms of pixel signals Vpix. FIG. 15D illustrates a waveform of a touch detection signal Vdet.

The display apparatus with touch detection functions in accordance with the present embodiment operates as follows. During the touch detection period A, the driving electrode driver 14 first puts the driving electrode COML associated with the touch detection conducted in the current touch detection period A into a floating state F (FIG. 15B). The source driver 13 then applies a pulsed touch driving signal to the pixel signal line SGL corresponding to that driving electrode COML (FIG. 15C). At this point, the touch driving signal applied to the pixel signal line SGL propagates to the driving electrode COML via a parasitic capacitor Cp (FIG. 15B). In other words, the source driver 13 indirectly drives the driving electrode COML via a parasitic capacitor Cp between the pixel signal line SGL and the driving electrode COML. Subsequent operation is similar to that of the first embodiment. In other words, the driving signal of the driving electrode COML propagates via a capacitor to a touch detection electrode TDL, in the form of a touch detection signal Vdet (FIG. 15D). The A/D converter 43 detects touch on one detection line by A/D converting this touch detection signal Vdet. Meanwhile, operation during the display period B is similar to that of the first embodiment.

As described above, the display apparatus with touch detection functions in accordance with the present embodiment is configured such that, during touch detection operation, the driving electrode driver 14 puts one of the driving electrodes COML into a floating state. In the case of driving using a dot inversion pattern, the driving electrode driver 14 also outputs a driving signal for display operation (in this case, a DC potential at 0 V) during display operation. In other words, in this example, the driving electrode driver 14 does not apply any voltages to the driving electrodes COML other than the driving signals used for display operation. For this reason, the driving electrode driver 14 does not generate and output many voltage levels. In so doing, the circuit layout for the driving electrode driver can be simplified.

In the present embodiment as described above, the source driver is configured to drive the driving electrodes COML, and thus some or most of the circuit layout for the driving electrode driver and the source driver can be shared. Other advantages are similar to those of the first embodiment.

4. Third Embodiment

Next, a display apparatus with touch detection functions in accordance with a third embodiment of the present invention will be described. In the present embodiment, a switch unit connecting the pixel signal lines SGL and the driving electrodes COML is newly provided. During the touch detection period A, the source driver drives the driving electrodes COML via this switch unit. Other parts of the configuration are similar to those of the first and second embodiments. Herein, identical reference numbers are given to portions of the configuration that are essentially identical to those of the display apparatus with touch detection functions in accordance with the first and second embodiments, and further description of such portions is omitted as appropriate.

Figure 16:
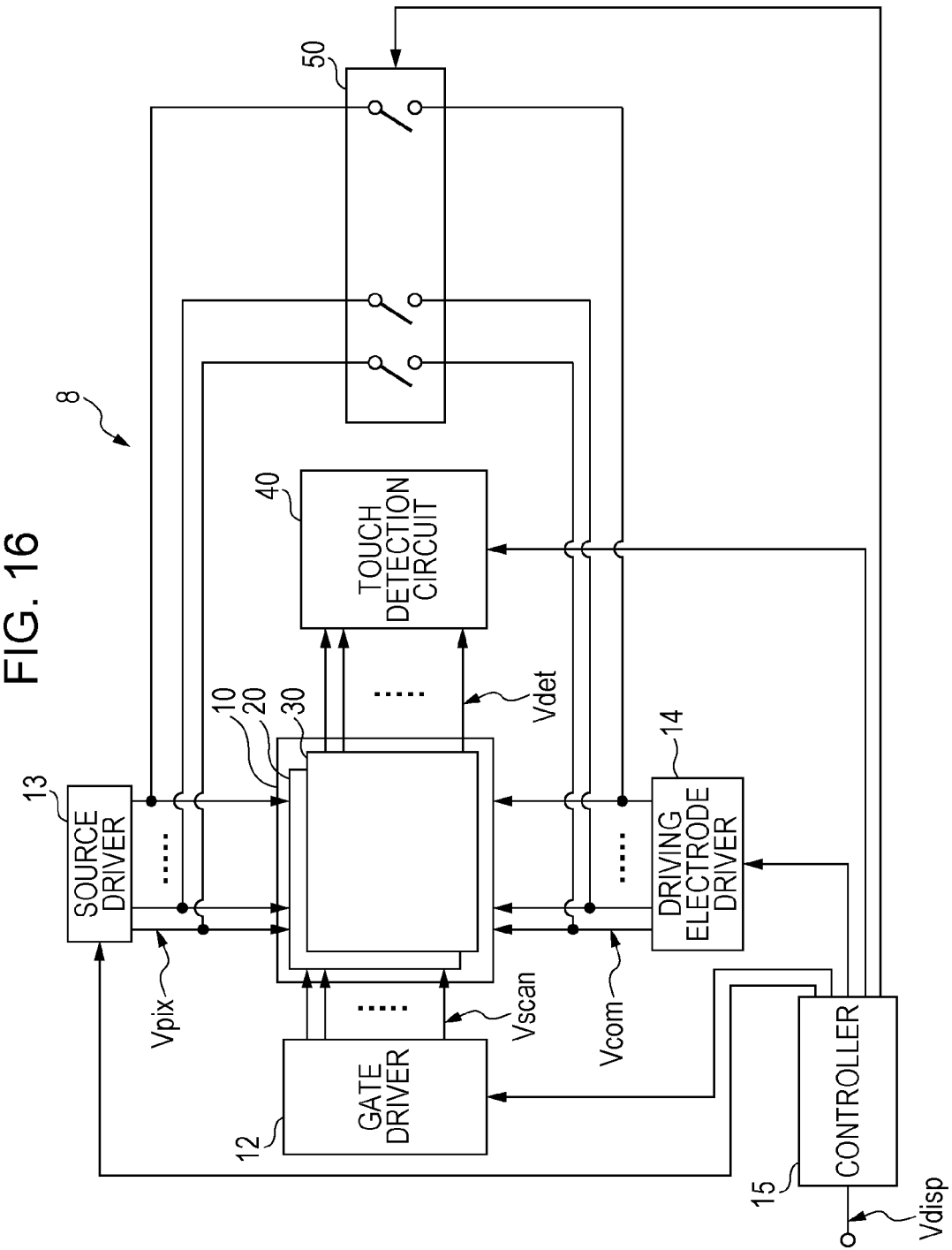
FIG. 16 is a block diagram illustrating one configuration of a display apparatus with touch detection functions that is consistent with the present invention.

FIG. 16 illustrates one exemplary configuration of a display apparatus with touch detection functions 8 in accordance with the third embodiment of the present invention. The display apparatus with touch detection functions 8 is provided with a switch unit 50. The switch unit 50 performs on/off control of connections between the pixel signal lines SGL connected to the source driver 13, and the driving electrodes COML connected to the driving electrode driver 14. The switch unit 50 is controlled by a controller 15 so as to switch on during the touch detection period A, and switch off during all other periods.

Herein, the switch unit 50 corresponds to a single specific example of a plurality of switches in accordance with an embodiment of the present invention.

The display apparatus with touch detection functions 8 in accordance with the present embodiment operates as follows. During the touch detection period A, the driving electrode driver 14 first puts all of the driving electrodes COML into a floating state. Alternatively, the driving electrode driver 14 may put only the driving electrode COML associated with the touch detection conducted in the current touch detection period A into a floating state. The source driver 13 then applies a pulsed touch driving signal to the pixel signal line SGL that corresponds to the driving electrode COML conducting touch detection operation. In so doing, a touch driving signal is applied via a switch to the driving electrode COML conducting touch detection operation. Subsequent operation is similar to that of the first and second embodiments. In other words, the driving signal of the driving electrode COML propagates via a capacitor to a touch detection electrode TDL, in the form of a touch detection signal Vdet. The A/D converter 43 detects touch on one detection line by A/D converting this touch detection signal Vdet. Meanwhile, operation during the display period B is similar to that of the first embodiment.

Similarly to the second embodiment, the display apparatus with touch detection functions 8 in accordance with the present embodiment is configured such that that driving electrode driver 14 does not apply any voltages to the driving electrodes COML other than the driving signals used during display operation. In so doing, the circuit layout of the driving electrode driver can be simplified.

In addition, since the source driver 13 is configured to apply touch driving signals to the driving electrodes COML via switches, the signals can be reliably transmitted to the driving electrodes COML.

As described above, since the present embodiment is configured such that the source driver drives the driving electrodes via switches, the signals can be reliably transmitted to the driving electrodes. Other advantages are similar to those of the first and second embodiments.

5. Applications

Next, applications of the display apparatus with touch detection functions as described in the foregoing embodiments and modifications will be described with reference to FIGS. 17 to 21G. It is possible to apply a display apparatus with touch detection functions in accordance with a foregoing embodiment or modification to a wide variety of electronic devices, such as televisions, digital cameras, laptop computers, mobile phones and other mobile terminals, and video cameras, for example. Stated differently, it is possible to apply a display apparatus with touch detection functions in accordance with a foregoing embodiment or modification to a wide variety of electronic devices that take an externally input or internally generated display signal, and display the signal as one or more images or video.

(Application 1)

Figure 17:
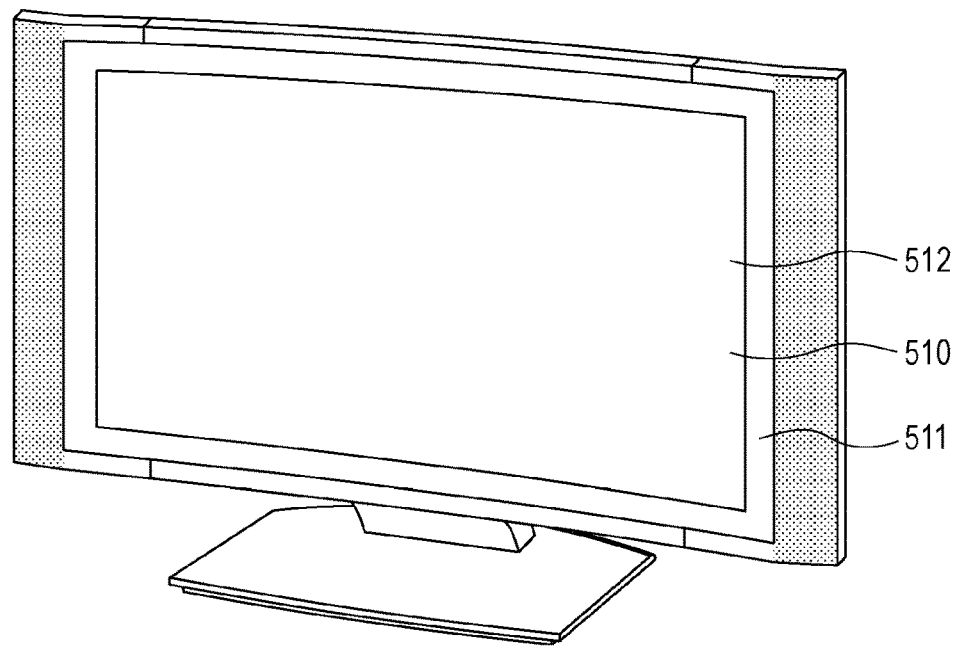
FIG. 17 is a perspective view illustrating the outer appearance of a display apparatus with touch detection functions that is consistent with the present invention.

FIG. 17 illustrates the outer appearance of a television, to which has been applied a display apparatus with touch detection functions in accordance with a foregoing embodiment or modification. The television may be provided with an image display screen unit 510, which may include a front panel 511 and a filter glass 512, for example. The image display screen unit 510 is realized by means of the display apparatus with touch detection functions in accordance with a foregoing embodiment or modification.

(Application 2)

Figure 18A:
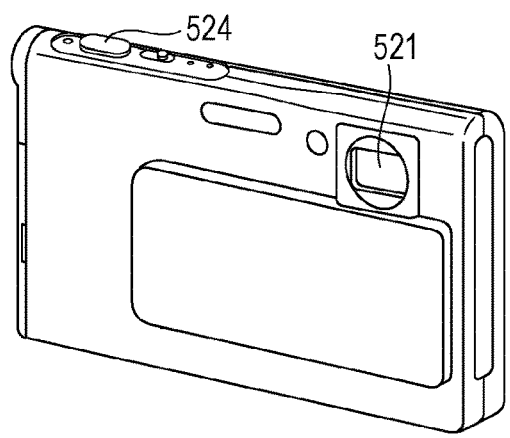
FIGS. 18A and 18B are perspective views illustrating the outer appearance of a display apparatus with touch detection functions that is consistent with the present invention.
Figure 18B:
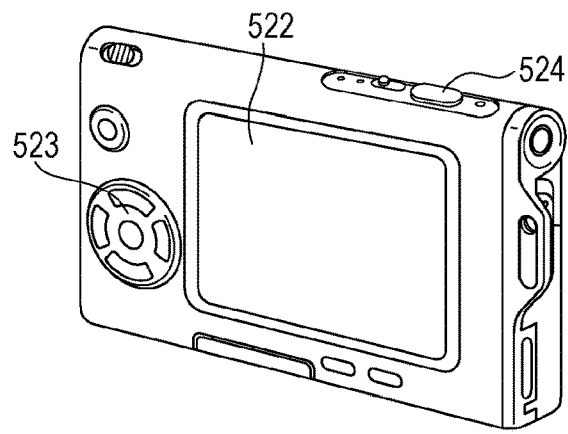

FIGS. 18A and 18B illustrates the outer appearance of a digital camera, to which has been applied a display apparatus with touch detection functions in accordance with a foregoing embodiment or modification. The digital camera may be provided with a flash unit 521 for providing flash, a display unit 522, menu switches 523, and a shutter button 523, for example. The display unit 522 is realized by means of the display apparatus with touch detection functions in accordance with a foregoing embodiment or modification.

(Application 3)

Figure 19:
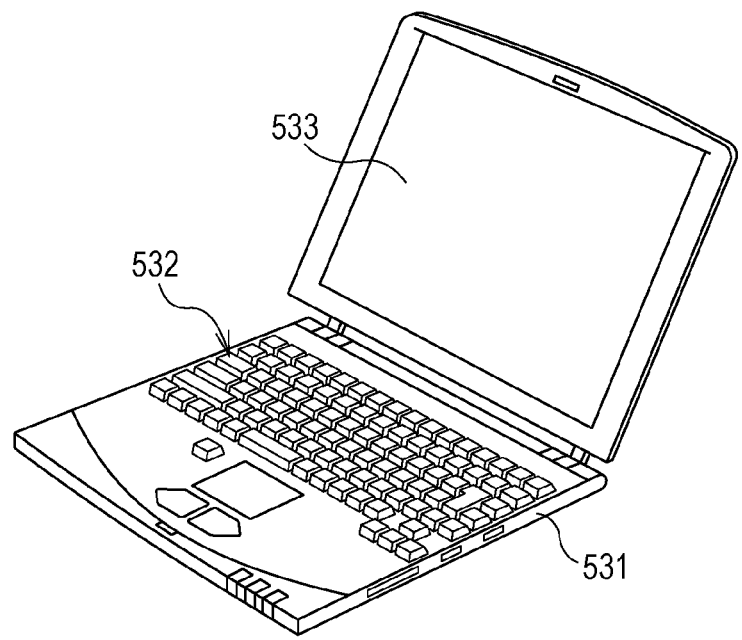
FIG. 19 is a perspective view illustrating a display apparatus with touch detection functions that is consistent with the present invention.

FIG. 19 illustrates the outer appearance of a laptop computer, to which has been applied a display apparatus with touch detection functions in accordance with a foregoing embodiment or modification. The laptop computer may be provided with a main body 531, a keyboard 532 for inputting text and other information, and a display unit 533 that displays images, for example. The display unit 533 is realized by means of the display apparatus with touch detection functions in accordance with a foregoing embodiment or modification.

(Application 4)

Figure 20:
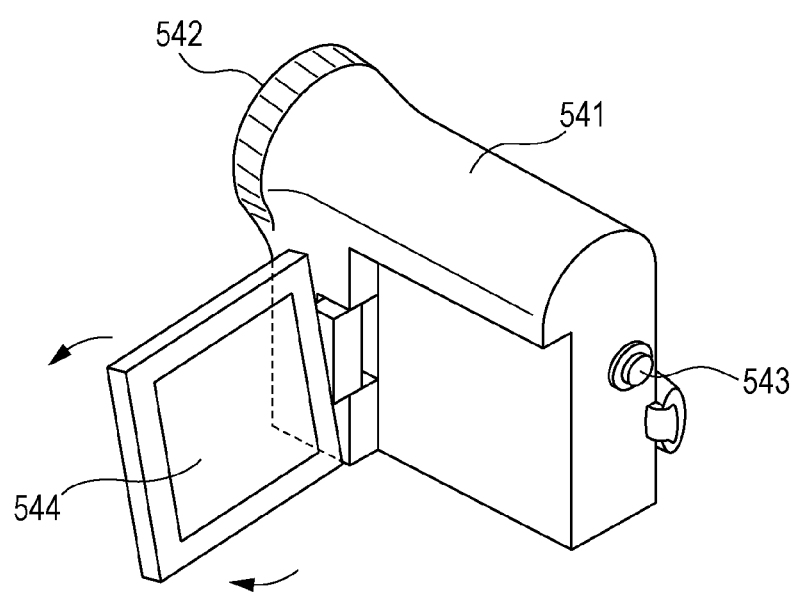
FIG. 20 is a perspective view illustrating a display apparatus with touch detection functions that is consistent with the present invention.
Figure 21E:
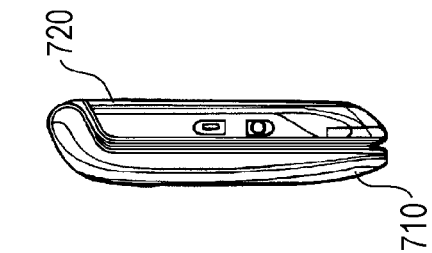
FIGS. 21A to 21G are front, side, top, and bottom views of a display apparatus with touch detection functions that is consistent with the present invention.
Figure 21F:
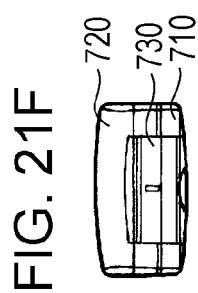
Figure 21C:
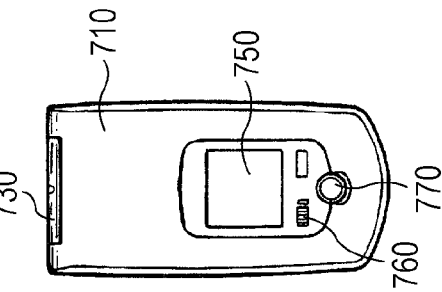
Figure 21G:
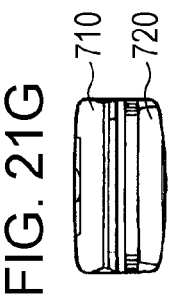
Figure 21D:
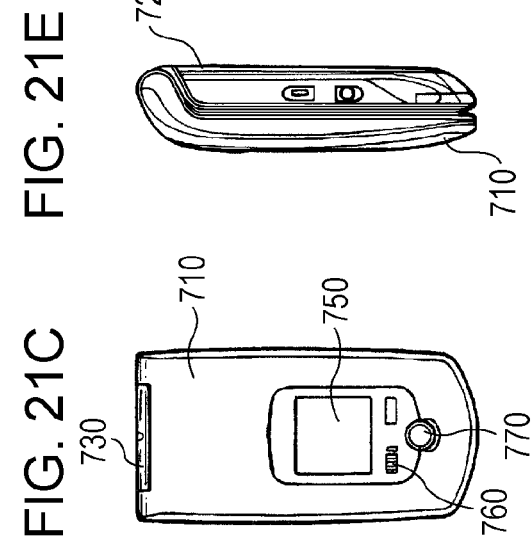
Figure 21B:
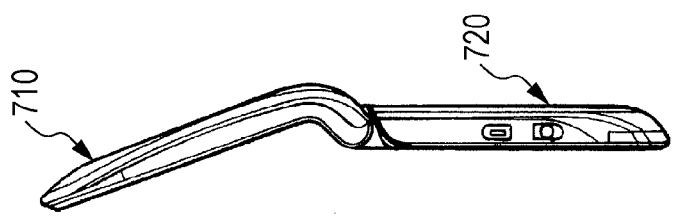
Figure 21A:
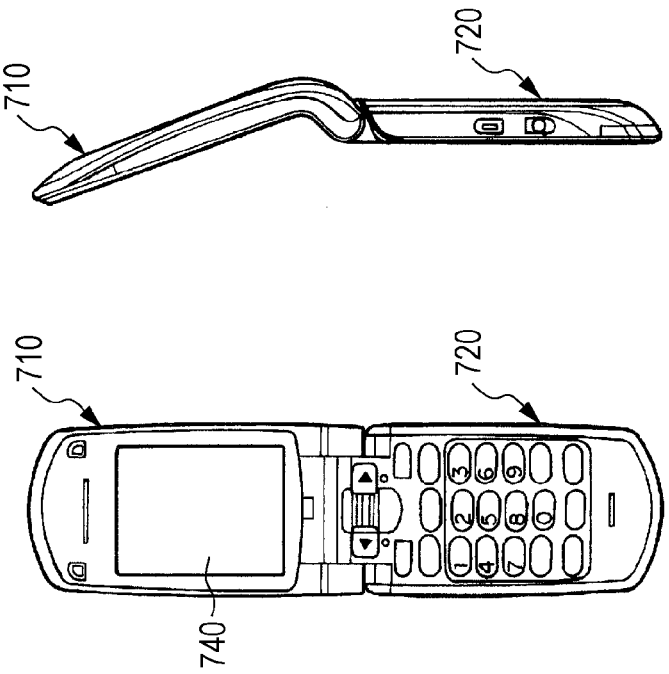

FIG. 20 illustrates the outer appearance of a video camera, to which has been applied a display apparatus with touch detection functions in accordance with a foregoing embodiment or modification. The video camera may be provided with a main body 541, a lens 542 for recording subjects that is disposed on the front lateral surface of the main body 541, a recording start/stop switch 543, and a display unit 544, for example. The display unit 544 is realized by means of the display apparatus with touch detection functions in accordance with a foregoing embodiment or modification.

(Application 5)

FIGS. 21A to 21G illustrate the outer appearance of a mobile phone, to which has been applied a display apparatus with touch detection functions in accordance with a foregoing embodiment or modification. The mobile phone may have an upper chassis 710 and a lower chassis 720 joined by a hinge 730, and be provided with a display 740, a sub-display 750, a picture light 760, and a camera 770. The display 740 or the sub-display 750 is realized by means of the display apparatus with touch detection functions in accordance with a foregoing embodiment or modification.

The foregoing thus describes the present invention by way of example with several embodiments and modifications, as well as exemplary applications to electronic devices. However, it should be appreciated that the present invention is not limited to the foregoing, and that various modifications are possible.

In the foregoing embodiments, the technique for driving the display in the LCD device is described as using a dot inversion pattern, wherein the polarity of the pixel signal is inverted on a dot-by-dot basis. However, an embodiment of the present invention is not limited to the above. Instead, the driving of the display may implement a line inversion pattern wherein the polarity of the pixel signal is inverted on a line-by-line basis, or a frame inversion pattern wherein the polarity of the pixel signal is inverted on a frame-by-frame basis, for example.

In the foregoing embodiments, the display driving signals are described as being DC signals set at 0 V. However, an embodiment of the present invention is not limited to the above. Instead, DC signals set at another voltage may be used, or AC signals may be used, for example. In the case where the display driving signals are AC signals, the LCD device will be AC driven.

In the foregoing embodiments, the display period B is described as being timed to occur after the touch detection period A during a single horizontal display period (1H). However, an embodiment of the present invention is not limited to the above. Instead, the touch detection period A may be timed to occur after the display period B.

In the foregoing embodiments, the display device with touch detection functions 10 is described as being realized by integrating a touch-detecting device 30 with an LCD device 20 that uses various liquid crystal modes, such as TN, VA, and ECB. However, the display device with touch detection functions 10 may be instead realized by integrating a touch-detecting device with an LCD device that uses liquid crystals configured for in-plane switching, such as fringe field switching (FFS) or in-plane switching (IPS) displays. For example, in the case of using liquid crystals configured for in-plane switching, it becomes possible to configure a display device with touch detection functions 60 as illustrated in FIG. 22. FIG. 22 illustrates one example of the primary cross-sectional structure of the display device with touch detection functions 60. FIG. 22 illustrates a liquid crystal layer 6B sandwiched between a pixel substrate 2B and a counter substrate 3B. Features such as the names and functions of other components are similar to those in FIG. 6, and thus further description of such features is herein omitted. This example differs from FIG. 6 in that the driving electrodes COML used for both display operation and touch detection operation are herein formed directly on top of the TFT substrate 21, and constitute part of the pixel substrate 2B. The pixel electrodes 22 are disposed above the driving electrodes COML via an insulating layer 23. In this case, all dielectric material between the driving electrodes COML and the touch detection electrodes TDL (including the liquid crystal layer 6B) contributes to the formation of the capacitor C1.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A display apparatus comprising:
    a first substrate;
    a second substrate facing the first substrate;
    a plurality pixel electrodes arranged in columns and rows above the first substrate, the columns extending along a first direction and the rows extending along a second direction orthogonal to the first direction;
    a plurality of common electrodes on the first substrate, each of the common electrodes overlapping widthwise two or more of the pixel electrodes;
    an insulating layer sandwiched between the pixel electrodes and the common electrodes;
    a plurality of touch electrodes on the second substrate;
    a plurality of pixel signal lines extending in the first direction; and
    a touch control unit electrically coupled to each of the common electrodes,
    wherein,
        in a display period, the touch control unit applies a fixed common voltage to all of the common electrodes and transmits a pixel signal to each of the pixel signal lines to display an image,
        in a touch period that is different from the display period, the touch control unit applies touch signals to less than all of the common electrodes to detect variances in capacitances formed between the common electrodes and the touch electrodes, and
        the touch control unit includes an analog to digital converter configured to conduct analog to digital conversion in the touch period.

2. The display apparatus according to claim 1, wherein the touch signals are pulsed, and the touch control unit sequentially drives the common electrodes with the pulsed touch signals in the touch period.

3. The display according to claim 1, wherein:
    in the touch period, the touch control unit transmits a touch signal to one of the pixel signal lines after putting a corresponding common electrode of the common electrodes into a floating state, thereby propagating the touch signal to the corresponding common electrode via capacitive coupling between the pixel signal line and the corresponding common electrode.

4. The display apparatus according to claim 1, wherein the touch control unit further includes an analog low pass filter, a signal processor, a coordinate extractor, and a detection timing controller.

5. The display apparatus according to claim 1, wherein:
    in the display period, the pixel electrodes are sequentially scanned in the first direction, and
    in the touch period, the common electrodes are scanned in a direction other than the first direction.

6. The display apparatus according to claim 5, wherein:
    the display apparatus has a long side and a short side,
    in the display period, the touch control unit scans each of a plurality of units to be driven along the long side of the display apparatus, and
    in the touch period, the touch control unit scans each of a plurality of units to be driven along the short side of the display apparatus.

7. The display apparatus according to claim 1, further comprising a liquid crystal layer between the first substrate and the second substrate.

* * * * *